(12) United States Patent
Du et al.

(10) Patent No.: US 11,886,617 B1
(45) Date of Patent: Jan. 30, 2024

(54) PROTECTING MEMBERSHIP AND DATA IN A SECURE MULTI-PARTY COMPUTATION AND/OR COMMUNICATION

(71) Applicant: Lemon Inc., Grand Cayman (KY)

(72) Inventors: Jian Du, Culver City, CA (US); Haohao Qian, Beijing (CN); Yongjun Zhao, Beijing (CN); Bo Jiang, Culver City, CA (US); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/297,447

(22) Filed: Apr. 7, 2023

(51) Int. Cl.
| | |
|---|---|
| *G06F 21/62* | (2013.01) |
| *G06F 16/25* | (2019.01) |
| *G06F 16/2455* | (2019.01) |

(52) U.S. Cl.
CPC .... *G06F 21/6245* (2013.01); *G06F 16/24558* (2019.01); *G06F 16/258* (2019.01)

(58) Field of Classification Search
CPC .... G08B 13/1672; G08B 7/066; G08B 17/00; G08B 17/06; G08B 19/00; G08B 25/014; G08B 25/04; G08B 25/10; G08B 25/14; G08B 29/188; G08B 29/24; G06F 16/61; G06F 21/602; G06Q 50/265; G07C 9/00182; H04L 9/0894; H04L 9/14; H04L 41/06; H04W 4/029; H04W 4/38; H04W 4/90; H04W 12/037; H04W 56/0015; H04W 84/18; H04W 84/20
USPC .......................................................... 726/26
See application file for complete search history.

(56) References Cited

U.S. PATENT DOCUMENTS

| | | | |
|---|---|---|---|
| 7,058,603 | B1 | 6/2006 | Rhiando |
| 9,652,622 | B2 | 5/2017 | Garfinkle et al. |
| 10,289,816 | B1 | 5/2019 | Malassenet |
| 11,522,688 | B2 | 12/2022 | Goodsitt et al. |
| 11,593,510 | B1 * | 2/2023 | Knox ............... G06F 21/6245 |
| 11,704,431 | B2 | 7/2023 | Kraus et al. |
| 2004/0179686 | A1 | 9/2004 | Matsumura et al. |

(Continued)

FOREIGN PATENT DOCUMENTS

CN 116049626 A 5/2023

OTHER PUBLICATIONS

Du et al., DP-PSI: Private and secure set intersection, Aug. 28, 2022, Cornel University, https://doi.org/10.48550/arXiv.2208.13249V1, p. 1-9. (Year: 2022).*

(Continued)

*Primary Examiner* — Jeffrey C Pwu
*Assistant Examiner* — Nega Woldemariam
(74) *Attorney, Agent, or Firm* — HAMRE, SCHUMANN, MUELLER & LARSON, P.C.

(57) ABSTRACT

Protecting membership and data in secure multi-party computation and communication is provided. A method of protecting membership and data includes generating a padding dataset. A size of the padding dataset is determined based on a data privacy configuration. The method also includes up-sampling a first dataset with the padding dataset, transforming the first dataset, dispatching the first dataset, performing an intersection operation based on the first dataset and a second dataset to generate a third dataset, generating a first share based on the third dataset, and constructing a result based on the first share and a second share.

19 Claims, 12 Drawing Sheets

(56) References Cited

U.S. PATENT DOCUMENTS

| | | |
|---|---|---|
| 2010/0131764 A1 | 5/2010 | Goh |
| 2011/0202764 A1 | 8/2011 | Furukawa |
| 2012/0143922 A1 | 6/2012 | Rane et al. |
| 2013/0212690 A1 | 8/2013 | Fawaz et al. |
| 2016/0150047 A1 | 5/2016 | O'Hare et al. |
| 2018/0101697 A1 | 4/2018 | Rane et al. |
| 2019/0065775 A1 | 2/2019 | Klucar, Jr. et al. |
| 2019/0244138 A1 | 8/2019 | Bhowmick et al. |
| 2019/0361794 A1 | 11/2019 | Maksyutov et al. |
| 2020/0250335 A1 | 8/2020 | Hockenbrocht et al. |
| 2020/0401726 A1 | 12/2020 | Lim et al. |
| 2021/0073677 A1 | 3/2021 | Peterson et al. |
| 2021/0173856 A1 | 6/2021 | Chitnis et al. |
| 2021/0336771 A1 | 10/2021 | Mukherjee |
| 2021/0360010 A1 | 11/2021 | Zaccak et al. |
| 2021/0399874 A1 | 12/2021 | Polyakov et al. |
| 2022/0100899 A1 | 3/2022 | Saillet et al. |
| 2022/0138348 A1 | 5/2022 | Bernau et al. |
| 2022/0244988 A1 | 8/2022 | Zhang et al. |
| 2022/0277097 A1 | 9/2022 | Cabot et al. |
| 2022/0335450 A1 | 10/2022 | Fenton et al. |
| 2022/0405800 A1 | 12/2022 | Walcott et al. |
| 2023/0017374 A1* | 1/2023 | Boehler ............... G06F 21/6245 |
| 2023/0045553 A1 | 2/2023 | Deshpande |
| 2023/0125887 A1 | 4/2023 | Habite et al. |
| 2023/0146259 A1 | 5/2023 | Liktor et al. |
| 2023/0214684 A1 | 7/2023 | Wang et al. |

OTHER PUBLICATIONS

Buddhavarapu et al., "Private matching for compute", Cryptology ePrint Archive, 2020, https://eprint.iacr.org/2020/599.

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.

Chandran et al., "Circuit-PSI with Linear Complexity via Relaxed Batch OPPRF", Cryptology ePrint Archive, received Jan. 12, 2021, https://eprint.iacr.org/2021/034.

Pinkas et al., "SpOT-Light: Lightweight Private Set Intersection from Sparse OT Extension", Cryptology ePrint Archive, received Jun. 3, 2019, https://eprint.iacr.org/2019/634.

Chase et al., "Secret Shared Shuffle", Cryptology ePrint Archive, received Nov. 22, 2019, https://eprint.iacr.org/2019/1340.

Mohassel et al., "How to Hide Circuits in MPC: An Efficient Framework for Private Function Evaluation", Cryptology ePrint Archive, received Mar. 9, 2013, https://eprint.iacr.org/2013/137.

Garimella et al., "Private Set Operations from Oblivious Switching", Cryptology ePrint Archive, received Mar. 2, 2021, https://eprint.iacr.org/2021/243.

Dwork et al., "Differential Privacy and Robust Statistics", Association for Computing Machinery, May 31, 2009, pp. 371-380, https://dl.acm.org/doi/10.1145/1536414.1536466.

Dwork et al., "Differential Privacy Under Continual Observation", Association for Computing Machinery, Jun. 5, 2010, pp. 715-724, https://dl.acm.org/doi/10.1145/1806689.1806787.

Dwork et al. "Our Data, Ourselves: Privacy via Distributed Noise Generation", Advances in Cryptology-EUROCRYPT 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.

Notice of Allowance dated Aug. 2, 2023 in U.S. Appl. No. 18/297,424.

Notice of Allowance dated Jul. 25, 2023 issued in U.S. Appl. No. 18/297,530.

Notice of Allowance dated Aug. 2, 2023 issued in U.S. Appl. No. 18/297,545.

Office Action dated Aug. 3, 2023 issued in U.S. Appl. No. 18/297,339.

Office Action dated Jun. 12, 2023 issued in U.S. Appl. No. 18/297,376.

Notice of Allowance dated Aug. 30, 2023 issued in U.S. Appl. No. 18/297,376.

Office Action dated Jul. 11, 2023 issued in U.S. Appl. No. 18/297,389.

Notice of Allowance dated Aug. 19, 2023 issue in U.S. Appl. No. 18/297,389.

Office Action dated Jun. 20, 2023 in U.S. Appl. No. 18/297,424.

Office Action dated Jun. 14, 2023 in U.S. Appl. No. 18/297,405.

Notice of Allowance dated Aug. 30, 2023 in U.S. Appl. No. 18/297,405.

Case, Benjamin et al. "The Privacy-preserving Padding Problem: Non-negative Mechanisms for Conservative Answers with Differential Privacy." 20 pages. Oct. 15, 2021. https://arxiv.org/abs/2110.08177.

Kairouz, Peter, Sewoong Oh, and Pramod Viswanath. "The composition theorem for differential privacy." International conference on machine learning. PMLR, 2015. (Year: 2015).

* cited by examiner

PROTECTING MEMBERSHIP AND DATA IN A SECURE MULTI-PARTY COMPUTATION AND/OR COMMUNICATION

FIELD

The embodiments described herein pertain generally to protecting membership privacy and data privacy. More specifically, the embodiments described herein pertain to protecting membership (of an element, a member, a user, etc.) privacy and data (e.g., features or attributes associated with the user, etc.) privacy in a secure multi-party computation and/or communication.

BACKGROUND

Private set intersection (PSI) is one of secure two- or multi-party protocols or algorithms by which intersection-related statistics are computed. PSI algorithms or protocols permit two or more organizations to jointly compute a function (e.g., count, sum, etc.) over the intersection of their respective data sets without revealing to other party the intersection explicitly. In an application, two parties may be unwilling or unable to reveal the underlying data to each other, but they may still want to compute an aggregate population-level measurement. The two parties may want to do so while ensuring that the input data sets reveal nothing beyond these aggregate values about individual users.

SUMMARY

Features in the embodiments disclosed herein may provide a secure multi-party computation (MPC) protocols or algorithms to facilitate effective and private measurement. Features in the embodiments disclosed herein may also provide protection to membership and data via e.g., differential privacy (DP) protocols or algorithms.

Features in the embodiments disclosed herein may further help solve a problem associated with privacy matching of two-party or multi-party data in a two-party or multi-party secure computation, and generating the secure sharing of data associated with the intersection of datasets from the two or more parties.

Features in the embodiments disclosed herein may generate padding or filling elements for each party's dataset independently following a pre-calibrated distribution of noise, add the padding elements to each dataset, and execute an MPC algorithm or protocol. Further features in the embodiments disclosed herein may lead to the intersection size revealed in the subsequent PSI operations being random and differentially private, making it almost impossible for an attacker to determine a user's membership to a dataset or organization, in compliance with privacy regulation requirements.

In one example embodiment, a method for protecting membership and data in secure multi-party computation and communication is provided. The method includes generating a padding dataset. A size of the padding dataset is determined based on a data privacy configuration. The method also includes up-sampling a first dataset with the padding dataset, transforming the first dataset, dispatching the first dataset, performing an intersection operation based on the first dataset and a second dataset to generate a third dataset, generating a first share based on the third dataset, and constructing a result based on the first share and a second share.

In another example embodiment, a secure multi-party computation and communication system is provided. The system includes a memory to store a first dataset and a processor to generate a padding dataset. A size of the padding dataset is determined based on a data privacy configuration. The processor is further to up-sample the first dataset with the padding dataset, transform the first dataset, dispatch the first dataset, perform an intersection operation based on the first dataset and a second dataset to generate a third dataset, generate a first share based on the third dataset, and construct a result based on the first share and a second share.

In yet another example embodiment, a non-transitory computer-readable medium having computer-executable instructions stored thereon is provided. The instructions, upon execution, cause one or more processors to perform operations including generating a padding dataset. A size of the padding dataset is determined based on a data privacy configuration. The operations also include up-sampling a first dataset with the padding dataset, transforming the first dataset, dispatching the first dataset, performing an intersection operation based on the first dataset and a second dataset to generate a third dataset, generating a first share based on the third dataset, and constructing a result based on the first share and a second share.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
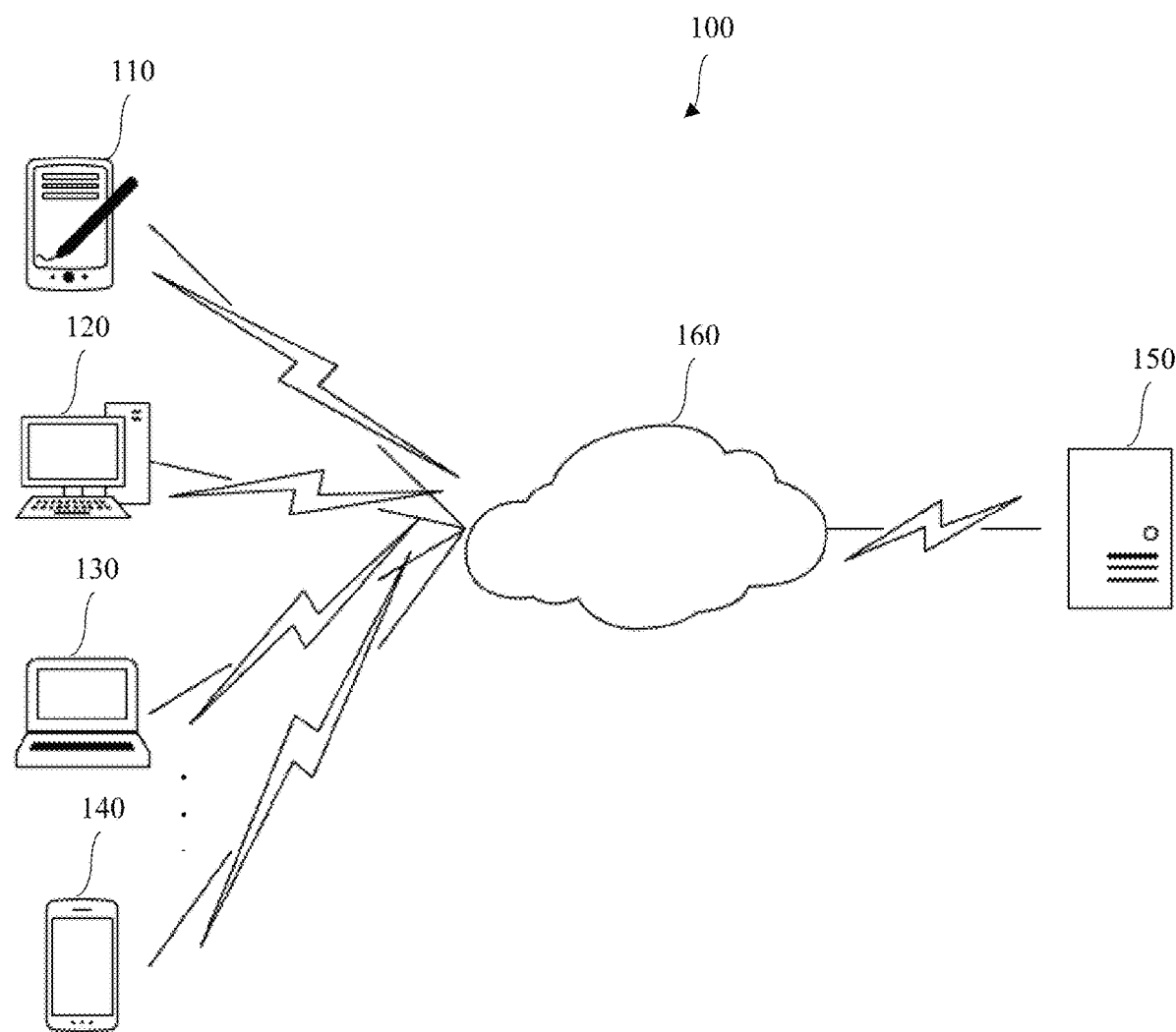
FIG. 1 is a schematic view of an example secure computation and communication system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, user's unique ID, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "ECC" or "elliptic-curve cryptography" is a term of art and may refer to a public-key cryptography based on the algebraic structure of elliptic curves over finite fields. It is to be understood that the ECC may allow smaller keys compared to non-EC cryptography to provide equivalent security. It is also to be understood that "EC" or "elliptic curve" may be applicable for key agreement, digital signatures, pseudo-random generators, and/or other tasks. Elliptic curves may be indirectly used for encryption by combining a key agreement between/among the parties with a symmetric encryption scheme. Elliptic curves may also be used in integer factorization algorithms based on elliptic curves that have applications in cryptography.

As referenced herein, "decisional Diffie-Hellman assumption" or "DDH assumption" is a term of art and may refer to a computational complexity assumption about a certain problem involving discrete logarithms in cyclic groups. It is to be understood that the DDH assumption may be used as a basis to prove the security of many cryptographic protocols.

As referenced herein, "elliptic-curve Diffie-Hellman" or "ECDH" is a term of art and may refer to a key agreement protocol or a corresponding algorithm that allows two or more parties, each having an elliptic-curve public-private key pair, to establish a shared secret over an unsecured channel. It is to be understood that the shared secret may be directly used as a key or to derive another key. It is also to be understood that the key, or the derived key, may then be used to encrypt or encode subsequent communications using a symmetric-key cipher. It is further to be understood that ECDH may refer to a variant of the Diffie-Hellman protocol using elliptic-curve cryptography.

As referenced herein, "homomorphic" encryption is a term of art and may refer to a form of encryption that permits users to perform computations on encrypted data without first decrypting it. It is to be understood that the resulting computations of homomorphic encryption are left in an encrypted form which, when decrypted, result in an identical output to that produced had the operations been performed on the unencrypted data. It is also to be understood that the homomorphic encryption can be used for privacy-preserving outsourced storage and computation, which may allow data to be encrypted and out-sourced to commercial cloud environments for processing, all while encrypted. It is further to be understood that an additively homomorphic encryption or cryptosystem may refer to a form of encryption or cryptosystem that, given only the public key and the encryption of message m1 and message m2, one can compute the encryption of m1+m2.

As referenced herein, "secret sharing" or "secret splitting" is a term of art and may refer to cryptographic actions or algorithms for generating a secret, breaking the secret into multiple shares, and distributing the shares among multiple parties, so that only when the parties bring together their respective shares can the secret be reconstructed. It is to be understood that secret sharing may refer to actions or algorithms for distributing a secret among a group, in such a way that no individual holds any intelligible information about the secret, but when a sufficient number of individuals combine their "shares", the secret may be reconstructed. It is also to be understood that whereas insecure secret sharing may allow an attacker to gain more information with each share, secure secret sharing may be "all or nothing", where "all" may mean the necessary number of shares.

As referenced herein, "private set intersection" is a term of art and may refer to a secure multi-party computation cryptographic operation, algorithm, or function by which two or more parties holding respective datasets compare encrypted versions of these datasets in order to compute the intersection. It is to be understood that for private set intersection, neither party reveals data elements to the counterparty except for the elements in the intersection.

As referenced herein, "shuffle", "shuffling", "permute", or "permuting" is a term of art and may refer to an action or algorithm for rearranging and/or randomly rearranging the order of the records (elements, rows, etc.) of e.g., an array, a dataset, a database, a data table, etc.

As referenced herein, a "semi-honest" adversary is a term of art and may refer to a party who may try corrupting parties but follow the protocol as specified. It is to be understood that the "semi-honest" party may be a corrupt party that runs a present protocol honestly but may try learning messages received from another party and/or parties for purposes e.g., beyond those intended by the protocol.

As referenced herein, "differential privacy" or "DP" is a term of art and may refer to a standard, a protocol, a system, and/or an algorithm for publicly sharing information regarding a dataset by describing patterns of groups of elements within the dataset while withholding information about individual users listed in the dataset. It is to be understood that differential privacy may refer to a constraint on algorithms used to release aggregate information about a statistical dataset or database to a user, which limits the disclosure of private information of records for individuals whose information is in the dataset or database.

The following is a non-limiting example of the context, setting, or application of differential privacy. A trusted data owner (or data holder or curator, such as a social media platform, a website, a service provider, an application, etc.) may have stored a dataset of sensitive information about users or members (e.g., the dataset includes records/rows of users or members). Each time the dataset is queried (or operated, e.g. analyzed, processed, used, stored, shared, accessed, etc.), there may be a chance or possibility of an individual's privacy being compromised (e.g., probability of data privacy leakage or privacy loss). Differential privacy may provide a rigorous framework and security definition for algorithms that operate on sensitive data and publish aggregate statistics to prevent an individual's privacy from being compromised by, e.g., resisting linkage attacks and auxiliary information, and/or supplying a limit on a quantifiable measure of harm (privacy leakage, privacy loss, etc.) incurred by individual record(s) of the dataset.

It is to be understood that the above requirement of the differential privacy protocol or algorithm may refer to a measure of "how much data privacy is afforded (e.g., by a single query or operation on the input dataset) when performing the operations or functions?" A DP parameter "$\epsilon$" may refer to a privacy budget (i.e., a limit of how much data privacy it is acceptable with leaking), e.g., indicating a maximum difference between a query or operation on dataset A and the same query or operation on dataset A' (that differs from A by one element or record). The smaller the value of $\epsilon$ is, the stronger the privacy protection is for the multi-identification privacy-protection mechanism. Another DP parameter "$\delta$" may refer to a probability, such as a probability of information being accidentally leaked. In an example embodiment, a required or predetermined numeric value of $\epsilon$ may range from at or about 1 to at or about 3. The required or predetermined numeric value of S may range from at or about $10^{-10}$ (or at about $10^{-8}$) to at or about $10^{-6}$. Yet another DP parameter sensitivity may refer to a quantified amount for how much noise perturbation may be required in the DP protocol or algorithm. It is to be understood that to determine the sensitivity, a maximum of possible change in the result may need to be determined. That is, sensitivity may refer to an impact a change in the underlying dataset may have on the result of the query to the dataset.

As referenced herein, "differential privacy composition" or "DP composition" is a term of art and may refer to the total or overall differential privacy when querying (or operating, e.g., analyzing, processing, using, storing, sharing, accessing, etc.) a particular dataset more than once. DP composition is to quantify the overall differential privacy (which may be degraded in view of the DP of a single query or operation) when multiple separate queries or operations are performed on a single dataset. It is to be understood that when a single query or operation to the dataset has a privacy loss L, the cumulative impact of N queries (referred to as N-fold composition or N-fold DP composition) on data privacy may be greater than L but may be lower than L*N. In an example embodiment, an N-fold DP composition may be determined based on an N-fold convolution operation of the privacy loss distribution. For example, a DP composition of two queries may be determined based on a convolution of the privacy loss distribution of the two queries. In an example embodiment, the number N may be at or about 10, at or about 25, or any other suitable number. In an example embodiment, ϵ, δ, sensitivity, and/or the number N may be predetermined to achieve a desired or predetermined data privacy protection goal or performance.

As referenced herein, "binomial distribution" in probability theory and statistics is a term of art and may refer to a discrete probability distribution of the number of successes in a sequence of n independent experiments, each asking a yes-no question, and each with its own Boolean-valued outcome: success (with probability p) or failure (with probability q=1−p). It is to be understood that Gaussian noise in the signal processing field may refer to a signal noise that has a probability density function equal to that of the normal distribution (i.e., the Gaussian distribution). In other words, the values that the Gaussian noise may take comply with a normal distribution (i.e., the Gaussian distribution). Similarly, binomial noise may refer to a signal noise that has a probability density function equal to that of the binomial distribution.

It is to be understood that the differential privacy requirements may be achieved via adding or injecting noise into the dataset studiously to form data anonymous, which may allow data users to execute all possible or useful statistical analysis on the dataset without identifying any personal information. It is also to be understood that adding controlled noise from a predetermined distributions (binomial distribution, Laplace distribution, normal/Gaussian distribution, etc.) may be a way of designing differentially private algorithms. It is further to be understood that adding noise may be useful for designing private protection mechanisms for real-valued functions on sensitive data.

As referenced herein, for cryptography, "oblivious transfer" is a term of art and may refer to an algorithm or protocol or operation in which a sender may transfer at least one of potentially many pieces of information to a receiver, but remains unaware of, unmindful of, or otherwise ignorant of what piece or pieces (if any) of information has been transferred. One form of oblivious transfer is "1-2 oblivious transfer" or "1 out of 2 oblivious transfer" for private and secure multi-party computation. For example, in a 1-2 oblivious transfer protocol or algorithm, the sender has two messages $m_0$ and $m_1$, and wants to ensure that the receiver only learns one. The receiver has a bit b (which may be 0 or 1) and wishes to receive $m_b$ from the sender without the sender learning b. Oblivious transfer may be generalized to "1 out of n oblivious transfers" by which a receiver receives exactly one dataset element without the sender knowing which element was queried, and without the receiver knowing anything about other elements that were not retrieved. A 1-out-of-n oblivious transfer protocol or algorithm may be defined as a natural generalization of a 1-out-of-2 oblivious transfer protocol or algorithm. In an example embodiment, a sender has n messages, and the receiver has an index i, and the receiver wishes to receive the i-th among the sender's messages, without the sender learning i, while the sender wants to ensure that the receiver receive only one of the n messages.

FIG. 1 is a schematic view of an example secure computation and communication system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple instances of server 150 or may be implemented by a single server 150.

A user may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
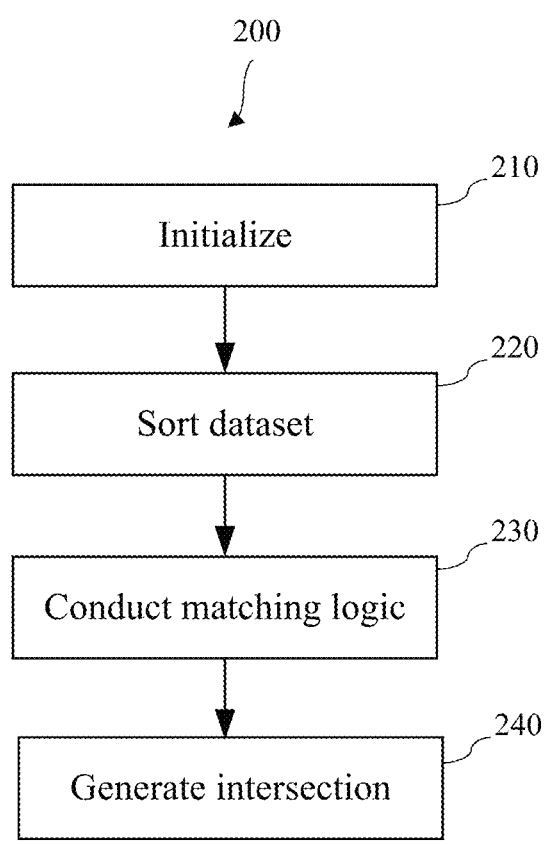
FIG. 2 is a flow chart illustrating an example processing flow for a multi-identification matching algorithm, in accordance with at least some embodiments described herein.

FIG. 2 is a flow chart illustrating an example processing flow 200 for a multi-identification matching algorithm, in accordance with at least some embodiments described herein.

Figure 3:
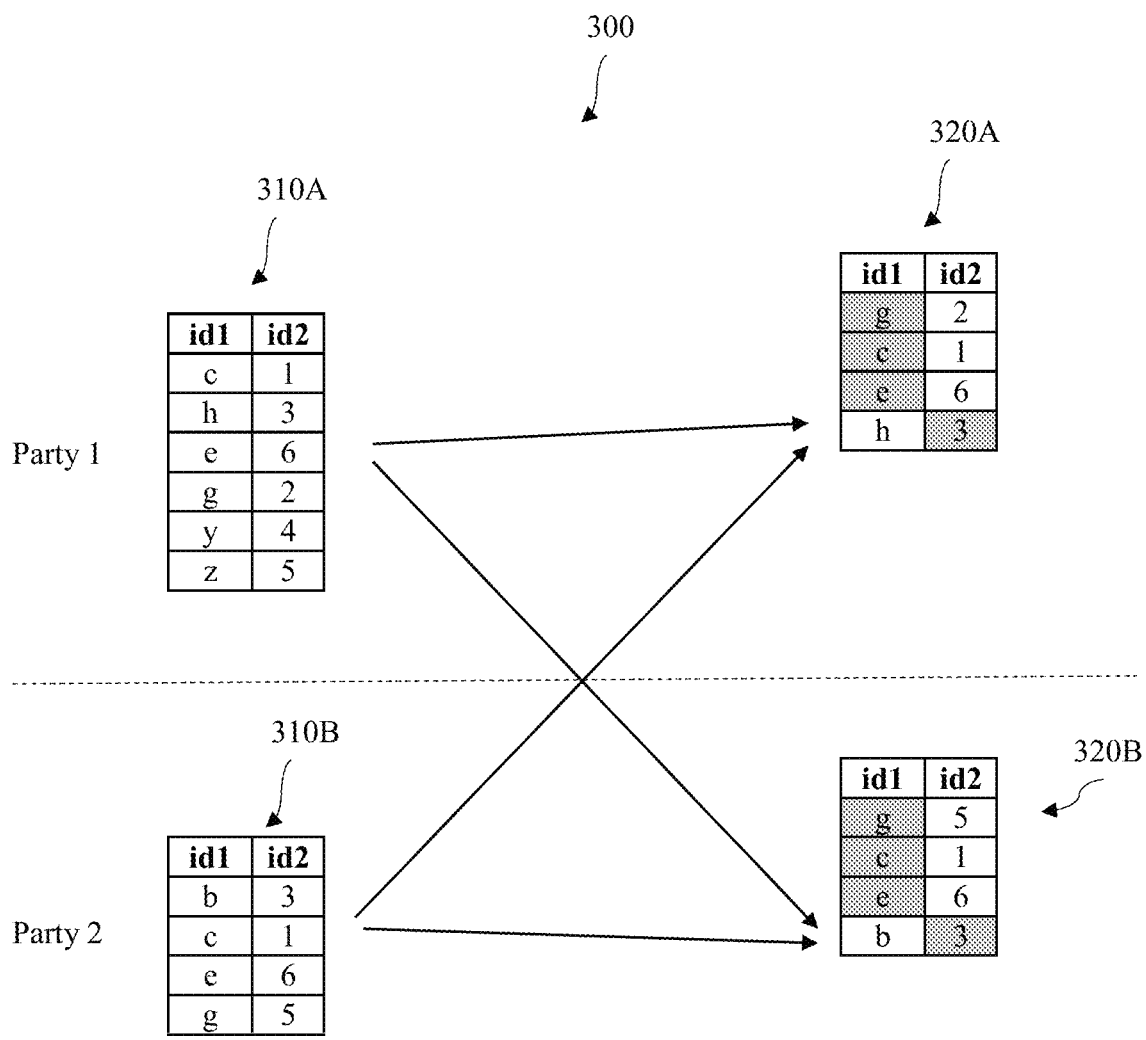
FIG. 3 is a schematic diagram illustrating an example of the processing flow of FIG. 2, in accordance with at least some embodiments described herein.

FIG. 3 is a schematic diagram 300 illustrating an example of the processing flow of FIG. 2, in accordance with at least some embodiments described herein. Thus, the description of processing flow 200 may reference 310A, 310B, 320A, and 320B of schematic diagram 300.

Figure 6:
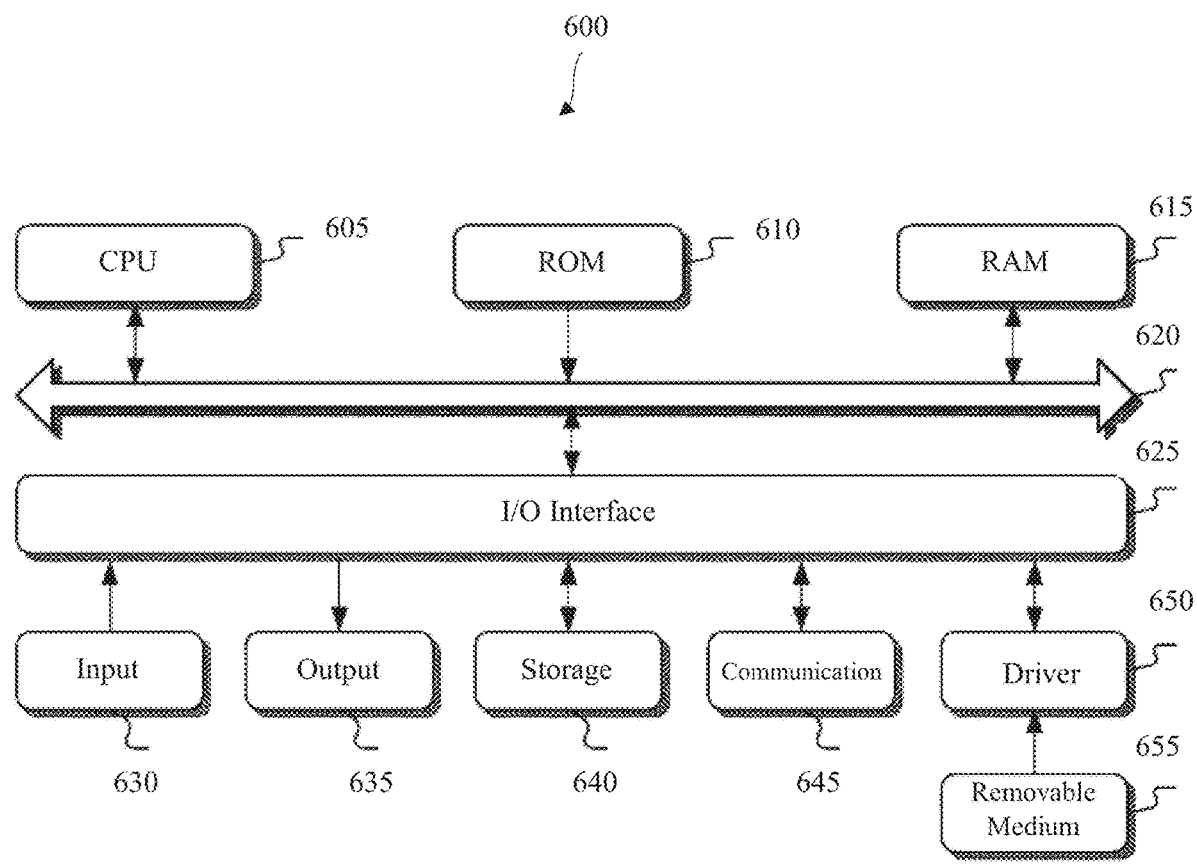
FIG. 6 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 200 can include one or more operations, actions, or functions as illustrated by one or more of blocks 210, 220, 230, and 240.

These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 200 may begin at block 210.

At block 210 (Initialize), the processor for a respective device may perform initialization functions or operations for, e.g., system parameters and/or application parameters. The processor of the respective device may provide a dataset (e.g., 310A) for Party 1, and/or provide a dataset (e.g., 310B) for Party 2. It is to be understood that the datasets 310A and/or 310B may be up-sampled datasets (e.g., 508A and/or 508B of FIG. 5A, etc.) generated or obtained at block 420 of FIG. 4A, described in detail further below.

It is also to be understood that each dataset 310A or 310B may include one or more identification (ID) fields or columns, and that the number of the identification fields or columns of the dataset 310A may or may not be equal to the number of the identification fields or columns of the dataset 310B. As shown in FIG. 3, each of the datasets 310A and 310B includes two ID fields: id1 and id2.

In an example embodiment, the processor of the respective device may shuffle the dataset 310A for Party 1 and/or shuffle the dataset 310B for Party 2. The processor may also transform the ID fields of the dataset 310A using a transforming scheme for Party 1.

It is to be understood that the function or operation to "transform" or of "transforming" a dataset or a portion thereof, e.g., one or more fields/columns (or records/rows) of a dataset such as one or more ID fields/columns (or records/rows), etc., may refer to processing (e.g., encrypting, decrypting, encoding, decoding, manipulating, compressing, decompressing, converting, etc.) the dataset or a portion thereof. It is also to be understood that the "transforming scheme" may refer to an algorithm, protocol, or function of performing the processing (e.g., encrypting, decrypting, encoding, decoding, manipulating, compressing, decompressing, converting, etc.) of the dataset or a portion thereof. In an example embodiment, the processor may encrypt (or decrypt, encode, decode, manipulate, compress, decompress, convert, etc.) the ID fields of the dataset 310A using e.g., a key of Party 1 based on e.g., an ECDH algorithm or protocol.

The processor may also transform the ID fields of the dataset 310B using a transforming scheme for Party 2. In an example embodiment, the processor may encrypt (or decrypt, encode, decode, manipulate, compress, decompress, convert, etc.) the ID fields of the dataset 310B using e.g., a key of Party 2 based on e.g., the ECDH algorithm or protocol.

It is to be understood that for Party 1 and/or Party 2, a sequence of the transforming of the ID fields of the dataset (310A or 310B) and the shuffling of the dataset (310A or 310B) may be switched or changed, without impacting the purpose of the resultant dataset.

The processor of the respective device may further exchange the dataset 310A with the dataset 310B between Party 1 and Party 2. For Party 1, the processor may dispatch or send the dataset 310A to Party 2, and receive or obtain the dataset 310B from Party 2. For Party 2, the processor may dispatch or send the dataset 310B to Party 1, and receive or obtain the dataset 310A from Party 1. It is to be understood that since the dataset 310A and the dataset 310B have been transformed (e.g., encoded, etc.), the corresponding receiving party may not know the real data in the received dataset. It is to be understood that each party may now have a local copy of both the dataset 310A and the dataset 310B.

The processor of the respective device may further transform the ID fields of the received transformed dataset 310B using a transforming scheme for Party 1. In an example embodiment, the processor may encrypt (or decrypt, encode, decode, manipulate, compress, decompress, convert, etc.) the ID fields of the received transformed dataset 310B using a key of Party 1 based on e.g., the ECDH algorithm or protocol. The processor of the respective device may further transform the ID fields of the received transformed dataset 310A using a transforming scheme for Party 2. In an example embodiment, the processor may encrypt (or decrypt, encode, decode, manipulate, compress, decompress, convert, etc.) the ID fields of the received transformed dataset 310A using a key of Party 2 based on e.g., the ECDH algorithm or protocol.

The processor may also shuffle the transformed received transformed dataset 310A for Party 2 and/or the transformed received transformed dataset 310B for Party 1. It is to be understood that for Party 1 and/or Party 2, a sequence of the transforming of ID fields of the received transformed dataset (310A and/or 310B) and the shuffling of the transformed received transformed dataset (310A and/or 310B) may be switched or changed, without impacting the purpose of the resultant dataset. The processor of the respective device may exchange the resultant shuffled dataset 310A (referred to as "310A" in blocks 220-240, to simplify the description) and the resultant shuffled dataset 310B (referred to as "310B" in blocks 220-240, to simplify the description) between Party 2 and Party 1. Processing may proceed from block 210 to block 220.

At block 220 (Sort dataset), the processor of the respective device may sort the dataset 310A and/or the dataset 310B for Party 1 and/or Party 2. For example, for Party 1, the processor may sort the ID fields (id1, id2, etc.) of the dataset 310A in an order (or sequence) corresponding to a predetermined importance or priority level of the ID fields. The dataset 310A may contain ID fields such as the user's name (e.g., having a priority level of 3, etc.), e-mail address (e.g., having a priority level of 2, etc.), phone numbers (e.g., having a priority level of 4, etc.), user's unique ID (e.g., having a priority level of 1, etc.), etc. In an example embodiment, the lower the priority level number is, the more important the corresponding ID field is. Sorting the ID fields of the dataset 310A may result in the user's unique ID (e.g., having a priority level of 1, etc.) being listed as the first field/column in the dataset 310A, the e-mail address (e.g., having a priority level of 2, etc.) being listed as the second field/column in the dataset 310A, the user's name (e.g., having a priority level of 3, etc.) being listed as the third field/column in the dataset 310A, and the phone numbers (e.g., having a priority level of 4, etc.) being listed as the fourth field/column in the dataset 310A. That is, in a non-limiting example of dataset 310A, the ID fields are sorted in ascending order of the number of the priority level: user's unique ID, email addresses, user names, and user phone numbers.

For Party 2, the processor may sort the ID fields (id1, id2, etc.) of the dataset 310B in the same order (or sequence) corresponding to the predetermined importance or priority level of the ID fields, as the order for the dataset 310A for Party 1. It is to be understood that the sorting of the datasets 310A and 310B is to prepare for the subsequent matching process. Processing may proceed from block 220 to block 230.

At block 230 (Conduct matching logic), with datasets 310A and 310B being sorted, the processor of the respective device may, for each ID field (starting from the ID field having the lowest priority level number, up to the ID field having the highest priority level number) of the dataset 310A, search for a match (or an inner join operation, etc.) between the dataset 310A and the dataset 310B to obtain or generate an intersection (dataset 320A of FIG. 3) for Party 1.

It is to be understood that the searching for a match operation (or an inner join operation, etc.) includes: for each ID field of the dataset 310A (starting from the ID field having the lowest priority level number, up to the ID field having the highest priority level number) and for each identification element in the dataset 310A that matches the identification element in the dataset 310B, removing the record (or row) of the dataset 310A that contains a matched identification element, and adding or appending the removed record (or row) of the dataset 310A to the dataset 320A.

For example, as shown in FIG. 3, for the ID field id1 in the dataset 310A, the records/rows containing "g", "c", "e" each has a corresponding match in the dataset 310B and such records/rows may be removed from the dataset 310A; and the removed records/rows may be added or appended to the dataset 320A. For id2 in the dataset 310A, the record/row containing "3" has a corresponding match in the dataset 310B and such record/row may be removed from the dataset 310A; and the removed record/row may be added or appended to the dataset 320A.

The processor of the respective device may, for each ID field (starting from the ID field having the lowest priority level number up to the ID field having the highest priority level number) of the dataset 310B, search for a match (or an inner join operation, etc.) between the dataset 310A and the dataset 310B to obtain or generate an intersection (dataset 320B of FIG. 3) for Party 2.

It is to be understood that the searching for a match operation (or an inner join operation, etc.) includes: for each ID field in the dataset 310B (starting from the ID field having the lowest priority level number, up to the ID field having the highest priority level number) and for each identification element in the dataset 310B that matches the identification element in the dataset 310A, removing the record (or row) of the dataset 310B that contains the matched identification element, and adding or appending the removed record (or row) of the dataset 310B to the dataset 255B.

For example, as shown in FIG. 3, for the ID field id1 in the dataset 310B, the records/rows containing "g", "c", "e" each has a corresponding match in the dataset 310A and such records/rows may be removed from the dataset 310B; and the removed records/rows may be added or appended to the dataset 320B. For id2 in the dataset 310B, the record/row containing "3" has a corresponding match in the dataset 310A and such record/row may be removed from the dataset 310B; and the removed record/row may be added or appended to the dataset 320B.

It is to be understood that the conducting matching logic/algorithm operations may be performed until all ID fields of the dataset 310A are processed for Party 1, and/or all ID fields of the dataset 310B are processed for Party 2. Processing may proceed from block 230 to block 240.

At block 240 (Generate intersection), the processor of the respective device may generate the intersection/dataset 320A for Party 1 when all ID fields of the dataset 310A are processed. The processor of the respective device may generate the intersection/dataset 320B for Party 2 when all ID fields of the dataset 310B are processed.

It is to be understood that the intersections 320A and/or 320B may be used for further MPC processing such as generating secret shares based on the intersections 320A and/or 320B, gathering secret shares, and/or generating the results by combining gathered secret shares, etc. See description of FIGS. 4A-5F for details.

Figure 4A:
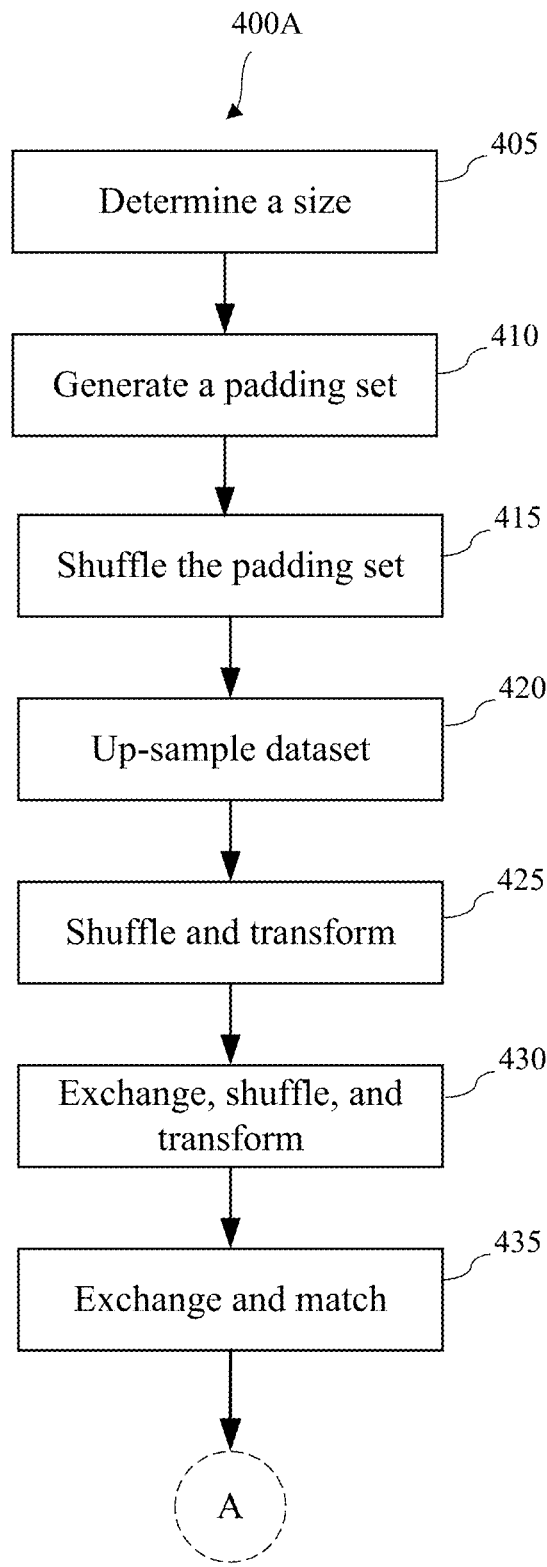
FIGS. 4A and 4B are flow charts illustrating an example processing flow for protecting membership and data in secure multi-party computation and communication, in accordance with at least some embodiments described herein.
Figure 4B:
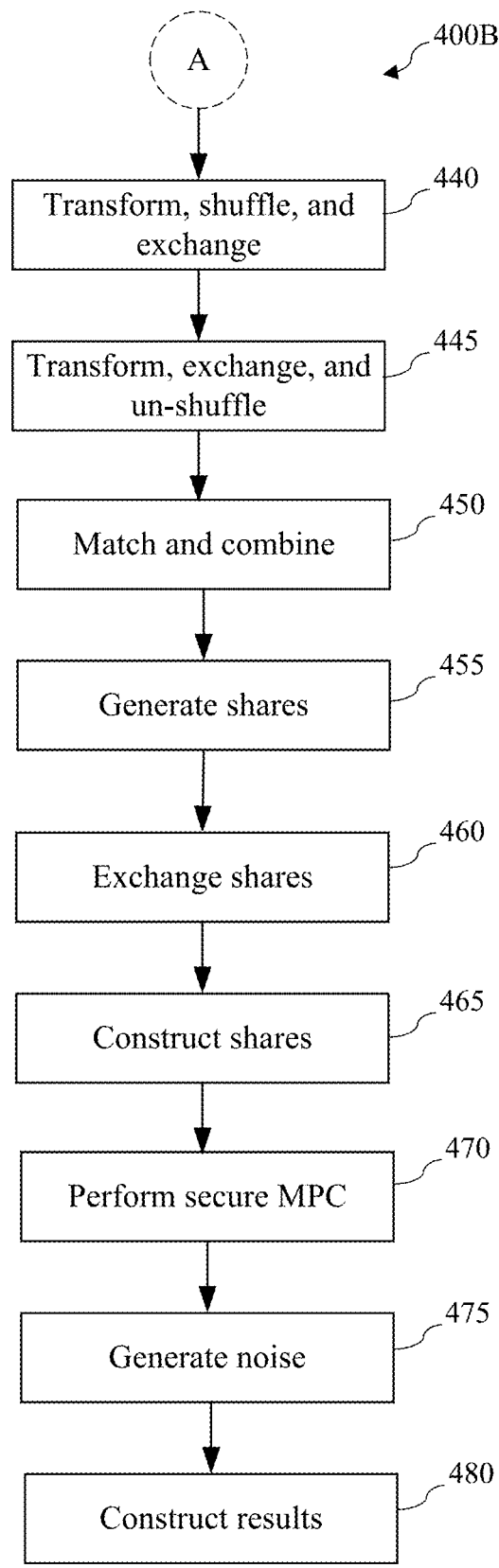

FIGS. 4A and 4B are flow charts illustrating progressive portions 400A and 400B, respectively, of an example processing flow for protecting membership and data in secure multi-party computation and communication, in accordance with at least some embodiments described herein.

FIGS. 5A-5F show progressive portions (500A-500F) of a schematic diagram illustrating an example of the processing flows of FIGS. 4A and 4B, in accordance with at least some embodiments described herein.

It is to be understood that the processing flow (400A and 400B) disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow (400A and 400B) can include one or more operations, actions, or functions as illustrated by one or more of blocks 405, 410, 415, 420, 425, 430, 435, 440, 445, 450, 455, 460, 465, 470, 475, and 480. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow (400A and 400B), operations including initializations or the like may be performed. For example, system parameters and/or application parameters may be initialized. Processing flow (400A and 400B) may begin at block 405.

At block 405 (Determine a size), the processor may determine a dataset size N (i.e., a number) that is to be used for generating padding/filling dataset(s) to achieve a desired membership privacy protection goal or performance (described in detail further below). It is to be understood that the size N is to be determined to ensure that a membership privacy configuration and/or privacy requirement is met or satisfied. In an example embodiment, the membership privacy configuration and/or privacy requirement may include configurations and/or requirement(s) (described in details below) defined in a differential privacy protocol or algorithm. Processing may proceed from block 405 to block 410.

At block 410 (Generate a padding set), the processor of the respective device may provide a dataset (e.g., 502A of FIG. 5A) for Party A, and/or provide a dataset (e.g., 502B) for Party B. It is to be understood that the operations or functions described in the processing flow (400A and 400B) may be symmetrical for Party A and Party B. It is also to be understood that the format, content, and/or arrangement of the datasets described herein are for descriptive purposes only and are not intended to be limiting.

For example, the dataset 502A may have more than one ID field (ID column: idA1, idA2, etc.) and/or one or more features or attributes (columns, e.g., T1, etc.) associated with the ID fields. In an example embodiment, the ID field idA1 may represent the user-names, and the ID field idA2 may represent the e-mail addresses.

For example, the dataset 502B may have more than one ID field (ID column: idB1, idB2, etc.) and/or one or more features or attributes (columns, e.g., T2, V, etc.) associated with the ID fields. In an example embodiment, the ID field idB1 may represent the user-names, and the ID field idB2 may represent the e-mail addresses.

Figure 5A:
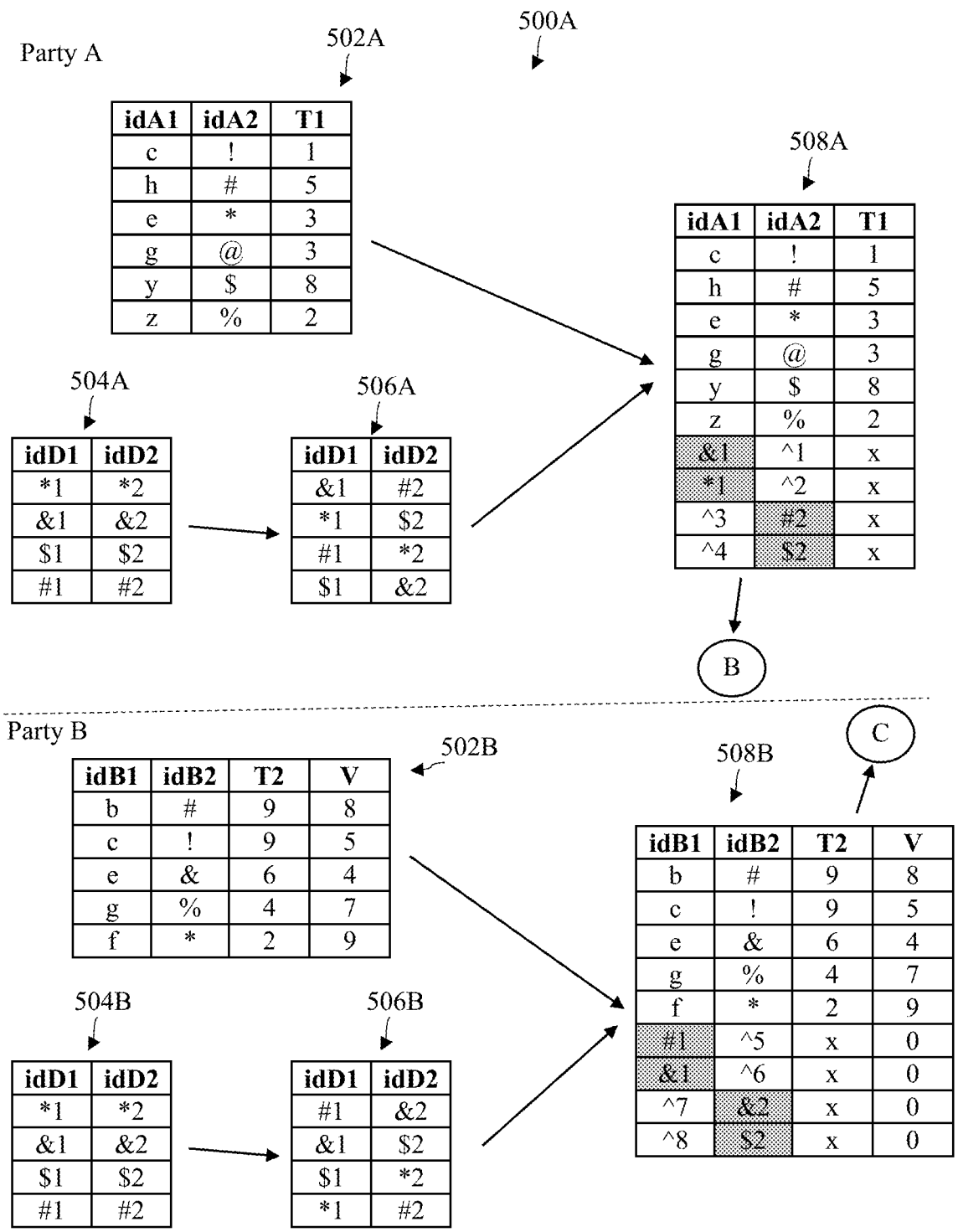
FIGS. 5A-5F show portions of a schematic diagram illustrating an example of the processing flows of FIGS. 4A and 4B, in accordance with at least some embodiments described herein.

For each ID field of dataset 502A (starting from the first ID field idA1 to the last ID field idA2) and/or 502B (starting from the first ID field idB1 to the last ID field idB2), the processor may generate a respective field (e.g., idD1, idD2, etc.) in the dataset (e.g., 504A and/or 504B of FIG. 5A). It is to be understood that the dataset (504A or 504B) may be a padding or filling dataset that is commonly used or shared by both Party A and Party B (e.g., the processor may provide a local copy 504B of the dataset 504A to Party B, or a local copy 504A of the dataset 504B to Party A). In an example embodiment, each of the datasets (504A, 504B) has a size of 2*N (see description of block 405). In other example embodiments, each of the datasets (504A, 504B) may have a size that is equal to or greater than N.

It is to be understood that a size of a dataset (e.g., 504A or 504B, etc.) may refer to the number of records (or rows, elements, etc.) of the dataset (e.g., 504A or 504B, etc.). It is also to be understood that when each of the datasets (504A, 504B) has a size of 2*N, the subsequent operations such as the PSI operations or MPC operations on the up-sampled datasets (e.g., 508A of FIG. 5A for party A and/or 508B of FIG. 5A for party B, described in detail further below) may guarantee being ($\epsilon$, $\delta$)-differentially private (described and/or defined below) for both Party A and/or Party B. In an example embodiment, $\epsilon$ and/or $\delta$ may be predetermined to achieve a desired membership privacy protection goal or performance.

Features (e.g., the determined size N, etc.) in the embodiments disclosed herein may be "($\epsilon$, $\delta$)-differentially private" (i.e., "differentially private" based on the $\epsilon$ and $\delta$) for the predetermined $\epsilon$ and $\delta$. That is, the size N may be determined based on the predetermined $\epsilon$ and $\delta$, such that being "($\epsilon$, $\delta$)-differentially private" may be achieved for the subsequent operations such as the PSI operations or MPC operations on the up-sampled datasets (i.e., the subsequent operations are "differentially private" based on the $\epsilon$ and $\delta$).

It is to be understood that the above configuration or requirement of the differential privacy protocol or algorithm may refer to a measure of "how much data privacy is afforded (e.g., by a query on the input dataset) to perform the operations or functions?" The measurable set E may refer to all potential output of M that may be predicted. The first parameter "$\epsilon$" may refer to a privacy budget (i.e., a limit of how much privacy leaking is acceptable), e.g., indicating a maximum difference between a query on dataset A and the same query on dataset A'. The smaller the value of $\epsilon$ is, the stronger the privacy protection is for the multi-identification privacy-protection mechanism. The second parameter "$\delta$" may refer to a probability, such as a probability of information being accidentally leaked. In an example embodiment, a required or predetermined value of $\epsilon$ may range from at or about 1 to at or about 3. The required or predetermined value of S may range from at or about $10^{-10}$ (or at about $10^{-8}$) to at or about $10^{-6}$. To achieve, meet, satisfy, or guarantee the requirement to be ($\epsilon$, $\delta$)-differentially private, the value of N may be at or about a few thousands.

In an example embodiment, the relationship among $\epsilon$, $\delta$, and N may be determined by predetermined or predefined algorithms. That is, the size N may be determined following a pre-calibrated or predetermined noise distribution, e.g., based on the required or predetermined $\epsilon$ and $\delta$, such that being "($\epsilon$, $\delta$)-differentially private" may be achieved for the subsequent operations such as the PSI operations or MPC operations on the up-sampled datasets.

It is also to be understood that the datasets (504A, 504B) are generated such that the intersection (e.g., a result of an inner join operation) of the ID field (idD1) in the dataset (504A or 504B) and its corresponding ID field (idA1 or idB1) in the dataset 502A for party A and the dataset 502B for Party B is empty (i.e., having a size of zero), and that the intersection of the ID field (idD2) in the dataset (504A or 504B) and its corresponding ID field (idA2 or idB2) in the dataset 502A for party A and the dataset 502B for Party B is empty (i.e., having a size of zero). That is, there is no common or shared element between idD1 and idA1 (and/or idD1 and idB1), and there is no common or shared element between idD2 and idA2 (and/or idD2 and idB2). Processing may proceed from block 410 to block 415.

At block 415 (Shuffle the padding set), the processor of the respective device may shuffle (e.g., randomly permute) each ID field (idD1 and idD2) of the datasets (504A, 504B) independently for Party A and for Party B, to produce a corresponding shuffled dataset (e.g., 506A of FIG. 5A) for Party A, and to produce a corresponding shuffled dataset (e.g., 506B of FIG. 5A) for Party B. Processing may proceed from block 415 to block 420.

At block 420 (Up-sample dataset), for each ID field (from the first ID field up to the last ID field) in the dataset 502A for Party A and in the dataset 502B for Party B, the processor of the respective device may up-sample the corresponding ID field in the dataset 502A for Party A and/or in the dataset 502B for Party B. It is to be understood that up-sampling a dataset X with a padding dataset may refer to e.g., inserting elements of the padding dataset and random elements into the dataset X. For example, the up-sampling of the corresponding ID field in the dataset 502A may include (1) selecting or obtaining the first N elements (or records, rows, etc.) of the respective ID field (idD1, idD2) in the dataset 506A, and (2) generating a union (resulting the corresponding ID fields in the dataset 508A of FIG. 5A) of the corresponding ID field in the dataset 502A and the first N elements of the respective ID field (idD1, idD2) in the dataset 506A, and (3) inserting N random numbers/elements into other fields of the dataset 508A that are in the same records/rows as the added/inserted/appended first N elements of the respective ID field (idD1, idD2) in the dataset 506A.

For example, as shown in FIG. 5A, N is determined to be 2 in block 405. For idA1 of the dataset 502A, the first N elements (or records, rows, etc.) of the ID field idD1 of the dataset 506A is selected or obtained. A union of the first N elements of the ID field idD1 of the dataset 506A and the idA1 field of the dataset 502A is generated to result in the idA1 field of the dataset 508A. N random numbers/elements are inserted into each of the other fields (idA2, etc.) of the dataset 508A that are in the same records/rows as the added/inserted/appended first N elements of the ID field idD1 of the dataset 506A. It is to be understood that any one of the N random numbers/elements has empty intersection with any other elements in the resultant dataset 508A for Party A, and has empty intersection with any elements in the resultant up-sampled dataset 508B for Party B.

For idA2 of the dataset 502A, the first N elements (or records, rows, etc.) of the ID field idD2 of the dataset 506A is selected or obtained. A union of the first N elements of the ID field idD2 of the dataset 506A and the idA2 field of the dataset 502A (expanded with the inserted 1*N random numbers/elements) is generated to result in the idA2 field of the dataset 508A. N random numbers/elements are inserted into each of the other fields (idA1, etc.) of the dataset 508A that are in the same records/rows as the added/inserted/appended first N elements of the ID field idD2 of the dataset 506A. It is to be understood that any one of the N random numbers/elements has empty intersection with any other elements in the resultant dataset 508A for Party A, and has empty intersection with any elements in the resultant up-sampled dataset 508B for Party B.

It is also to be understood that the up-sampled dataset 508A may be used as the dataset 310A of FIG. 3. Similarly, the ID fields (idB1, idB2) of the dataset 502B for Party B may also be up-sampled using independently shuffled ID fields (idD1 and idD2) of the dataset 506B to generate an up-sampled dataset (e.g., 508B of FIG. 5A or 310B of FIG. 3).

It is further to be understood that for the V field of 508B, the added/inserted/appended elements can be all zero (represented by "0"), and thus for the T1 field of 508A and/or the T2 field of 508B, the added/inserted/appended elements can be any value (represented by "x") without impacting the final statistic results.

It is to be understood that the processor of the respective device may process the up-sampled dataset 508A for Party A and/or the up-sampled dataset 508B for Party B, to generate intersections (without revealing the real size of the intersection because of the padding/filling elements and the random numbers/elements being inserted in the up-sampled datasets for Party A and/or Party B) for further process. It is also to be understood that a size of the intersection of the up-sampled dataset 508A of Party A and the up-sampled dataset 508B of Party B does not reveal the real intersection size of the original datasets (e.g., 502A for Party A and 502B for Party B) due to the introducing of the datasets (504A, 504B) and the random numbers/elements for up-sampling. That is, features in the embodiments disclosed herein may lead to the intersection size revealed in the following PSI operations or MPC operations being random and differentially private, making it almost impossible for an attacker to determine a user's membership based on the size of the intersection.

As shown in FIG. 5A, in an example embodiment, the dataset 508A includes multiple records (rows), each record including a first member or user identification (idA1), a second member or user identification (idA2), and a time (T1) indicating e.g., the time (e.g., the starting time or timestamp) at which that member or user has clicked on e.g., a link or the like on Party A's platform. The dataset 508B includes multiple records (rows), each record including a first member or user identification (idB1), a second member or user identification (idB2), a time (T2) indicating e.g., the time (e.g., the starting time or timestamp) at which that member or user has interacted with Party B's website, and a value (V) indicating the value of the user for Party B. In an example embodiment, the time (or timestamp) is listed in units of "minutes". It is to be understood that the format, content, and/or arrangement of the dataset 508A and/or 508B are for descriptive purposes only and are not intended to be limiting. For example, each dataset 508A or 508B may have one or more IDs (columns) and/or zero or one or more features or attributes (columns) associated with the ID or IDs.

In an example embodiment, for various reasons pertaining to Party A and/or Party B, it may be prudent to determine e.g., (1) how many members or users who clicked on e.g., a link or the like on Party A's platform, which led to interaction with Party B's website and made valuable interaction, (2) how many members or users who clicked on e.g., a link or the like on Party A's platform, which led to interaction with Party B's website within a certain period of time (e.g., within 7 minutes) after the user clicked on e.g., a link or the like on Party A's platform, and made valuable interaction, and/or (3) the total value of all members or users who clicked on e.g., a link or the like on Party A's platform, which led to interaction with Party B's website within a certain period of time (e.g., within 7 minutes) after the members or users clicked on e.g., a link or the like on Party A's platform and made valuable interaction.

It is to be understood that, for various reason(s), Party A and/or Party B may not want to reveal to the other party at least portions of data in the dataset 508A and/or the dataset 508B, respectively, and/or in the intersection of the dataset 508A and the dataset 508B. Processing may proceed from block 420 to block 425.

Figure 5B:
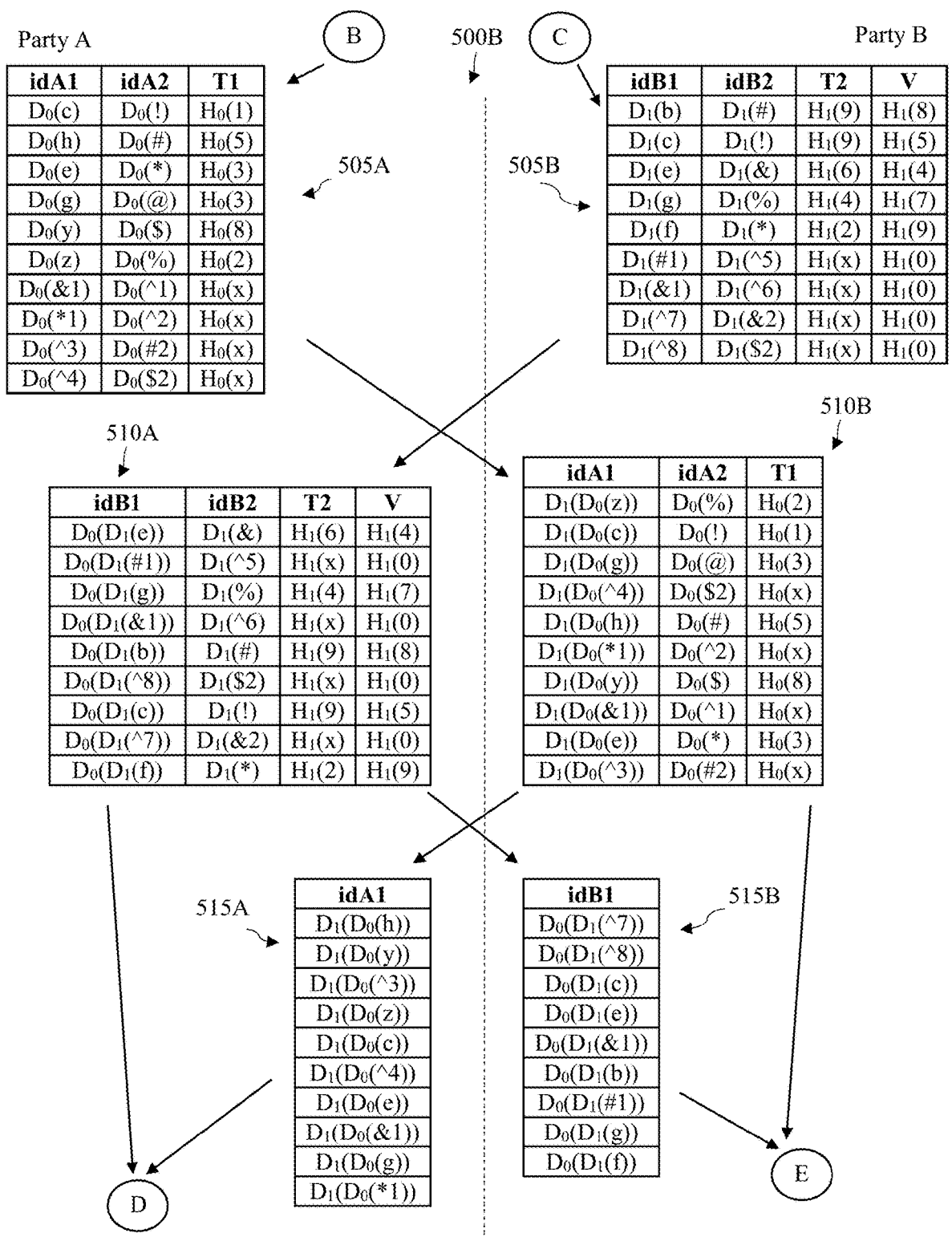

At block 425 (Shuffle and transform), the processor may transform the ID fields (columns, idA1 and idA2) of the dataset 508A using a transforming scheme for Party A (to obtain or generate the dataset 505A of FIG. 5B). It is to be understood that the function or operation to "transform" or of "transforming" a dataset or a portion thereof, e.g., one or more columns (or rows) of a dataset such as one or more identification fields/columns (or records/rows), etc., may refer to processing (e.g., encrypting, decrypting, encoding, decoding, manipulating, compressing, decompressing, converting, etc.) the dataset or a portion thereof. It is also to be understood that the "transforming scheme" may refer to an algorithm, protocol, or function of performing the processing (e.g., encrypting, decrypting, encoding, decoding, manipulating, compressing, decompressing, converting, etc.) of the dataset or a portion thereof.

In an example embodiment, the processor may encrypt (or decrypt, encode, decode, manipulate, compress, decompress, convert, etc.) the ID of the dataset 508A (to obtain or generate the dataset 505A) using e.g., a key of Party A based on an ECDH algorithm or protocol (represented by the function $D_0(\cdot)$).

The processor may also transform the ID fields (idB1 and idB2) of the dataset 508B using a transforming scheme for Party B (to obtain or generate the dataset 505B of FIG. 5B). In an example embodiment, the processor may encrypt (or decrypt, encode, decode, manipulate, compress, decompress, convert, etc.) the ID of the dataset 508B (to obtain or generate the dataset 505B) using e.g., a key of Party B based on the ECDH algorithm or protocol (represented by the function $D_1(\cdot)$).

The processor may further transform the data T1 (column, feature, attribute) of the dataset 508A using a transforming scheme for Party A (to obtain or generate the dataset 505A).

In an example embodiment, the processor may encrypt (or decrypt, encode, decode, manipulate, compress, decompress, convert, etc.) T1 of the dataset 508A (to obtain or generate the dataset 505A) using e.g., a key of Party A based on an additively homomorphic encryption algorithm or protocol (represented by the function $H_0(\cdot)$).

The processor may also transform the data T2 (column, feature, attribute) and the data V (column, feature, attribute) of the dataset 510B (to obtain or generate the dataset 505B) using a transforming scheme for Party B. In an example embodiment, the processor may encrypt (or decrypt, encode, decode, manipulate, compress, decompress, convert, etc.) the T2 and V of the dataset 508B (to obtain or generate the dataset 505B) using e.g., a key of Party B based on the additively homomorphic encryption algorithm or protocol (represented by the function $H_1(\cdot)$).

The processor of the respective device may shuffle (e.g., randomly permute, etc.) the dataset 505A for Party A, and/or shuffle the dataset 505B for Party B.

It is to be understood that at block 425, for Party A and/or Party B, a sequence of the transforming of the dataset and the shuffling of the dataset may be switched or changed, without impacting the purpose of the resultant dataset. For example, the processor may shuffle the dataset 508A, and then transform the shuffled dataset to obtain or generate the dataset 505A for Party A. The processor may also shuffle the dataset 508B, and then transform the shuffled dataset to obtain or generate the dataset 505B for Party B. Processing may proceed from block 425 to block 430.

At block 430 (Exchange, shuffle, and transform), the processor of the respective device may exchange the dataset 505A (after being shuffled) with the dataset 505B (after being shuffled) between Party A and Party B. For Party A, the processor may dispatch or send the dataset 505A (after being shuffled) to Party B, and receive or obtain the dataset 505B (after being shuffled) from Party B as dataset 510A (see FIG. 5B). For Party B, the processor may dispatch or send the dataset 505B (after being shuffled) to Party A, and receive or obtain the dataset 505A (after being shuffled) from Party A as dataset 510B (see FIG. 5B). It is to be understood that since the dataset 505A and the dataset 505B have been transformed (e.g., encoded, etc.), the corresponding receiving party may not know the real data in the received dataset.

The processor may further transform the ID field (idB1) of the dataset 510A using a transforming scheme for Party A. In an example embodiment, the processor may encrypt (or decrypt, encode, decode, manipulate, compress, decompress, convert, etc.) the ID field (idB1) of the dataset 510A using a key of Party A based on the ECDH algorithm or protocol (represented by the function $D_0(\cdot)$). The processor may further transform the ID field (idA1) of the dataset 510B using a transforming scheme for Party B. In an example embodiment, the processor may encrypt (or decrypt, encode, decode, manipulate, compress, decompress, convert, etc.) the ID field (idA1) of the dataset 510B using a key of Party B based on the ECDH algorithm or protocol (represented by the function $D_1(\cdot)$). It is to be understood that the results of the functions $D_1(D_0(p))$ and $D_0(D_1(p))$ may be the same for a same parameter "p".

The processor may also shuffle the dataset 510A for Party A, and/or shuffle the dataset 510B for Party B. It is to be understood that at block 430, for Party A and/or Party B, a sequence of the transforming of the ID field of the dataset and the shuffling of the dataset may be switched or changed, without impacting the purpose of the resultant dataset. For example, the processor may shuffle the dataset 510A, and then transform the shuffled dataset 510A for Party A. The processor may also shuffle the dataset 510B, and then transform the dataset 510B for Party B. Processing may proceed from block 430 to block 435.

At block 435 (Exchange and match), the processor of the respective device may extract the ID field (idA1) of the dataset 510B (after being shuffled) to obtain or generate the dataset 515A for Party A, and/or extract the ID field (idB1) of the dataset 510A (after being shuffled) to obtain or generate the dataset 515B for Party B. The processor of the respective device may also exchange the extracted dataset 510A (the idB1 field, after being shuffled) with the extracted dataset 510B (the idA1 field, after being shuffled) between Party A and Party B. For Party A, the processor may dispatch or send the extracted dataset 510A (the idB1 field, after being shuffled) to Party B, and receive or obtain the extracted dataset 510B (the idA1 field, after being shuffled) from Party B as dataset 515A. For Party B, the processor may dispatch or send the extracted dataset 510B (the idA1 field, after being shuffled) to Party A, and receive or obtain the extracted dataset 510A (the idB1 field, after being shuffled) from Party A as dataset 515B.

The processor may also perform search for a match (or an inner join operation, etc.) between the dataset 510A and the dataset 515A to obtain or generate an intersection (dataset 520A of FIG. 5C) for Party A. It is to be understood that the above operation includes for each identification in the dataset 515A that matches the identification in the dataset 510A, adding or appending the record (or row) of the dataset 510A that contains the matched identification to the dataset 520A, and removing the record (or row) that contains the matched identification from the dataset 510A to obtain or generate a resultant dataset 525A.

The processor may also perform search for a match (or an inner join operation, etc.) between the dataset 510B and the dataset 515B to obtain or generate an intersection (dataset 520B of FIG. 5C) for Party B. It is to be understood that the above operation includes for each identification in the dataset 515B that matches the identification in the dataset 510B, adding or appending the record (or row) of the dataset 510B that contains the matched identification to the dataset 520B, and removing the record (or row) that contains the matched identification from the dataset 510B to obtain or generate a resultant dataset 525B.

It is to be understood that in an example embodiment, the idB2 field in the dataset/intersection 520A may be optional since the matching is based on idB1 (which has a higher priority than idB2). The idA2 field in the dataset/intersection 520B may be optional since the matching is based on idA1 (which has a higher priority than idA2). It is also to be understood that the dataset 525A includes all the unmatched records (rows) of the dataset 510A. The dataset 525B includes all the unmatched records (rows) of the dataset 510B.

It is to be understood that for Party A, data in the intersection 520A are also transformed (e.g., encoded, etc.) by Party B (via $D_1(\cdot)$ and $H_1(\cdot)$), and thus Party A may not know the real data in the intersection 520A. For Party B, data in the intersection 520B are also transformed (e.g., encoded, etc.) by Party A (via $D_0(\cdot)$ and $H_0(\cdot)$), and thus Party B may not know the real data in the intersection 520B. That is, the matching or inner join operation conducted, as described above, is a "private" matching or inner join operation. The processor performs a private identity matching without revealing the intersection of datasets of the two parties. Processing may proceed from block 435 to block 440.

Figure 5C:
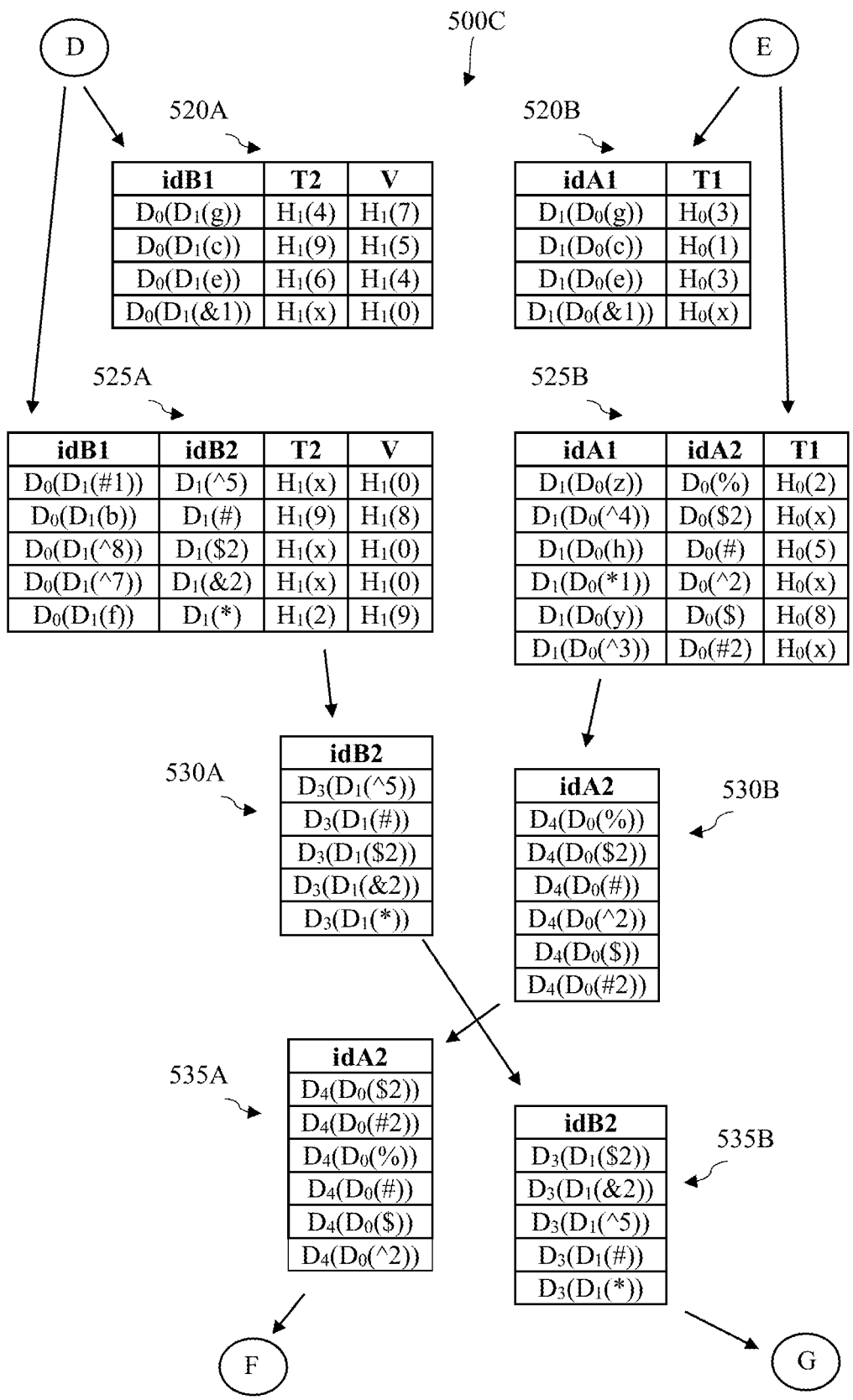

At block 440 (Transform, shuffle, and exchange), the processor of the respective device may transform the ID field (column, idB2) of the dataset 525A using a transforming scheme for Party A (to obtain or generate the dataset 530A of FIG. 5C). In an example embodiment, the processor may encrypt (or decrypt, encode, decode, manipulate, compress, decompress, convert, etc.) the ID field idB2 of the dataset 525A (to obtain or generate the dataset 530A) using e.g., another key of Party A based on an ECDH algorithm or protocol (represented by the function $D_3(\cdot)$).

The processor may also transform the ID field (idA2) of the dataset 525B using a transforming scheme for Party B (to obtain or generate the dataset 530B of FIG. 5C). In an example embodiment, the processor may encrypt (or decrypt, encode, decode, manipulate, compress, decompress, convert, etc.) the ID field idA2 of the dataset 525B (to obtain or generate the dataset 530B) using e.g., another key of Party B based on the ECDH algorithm or protocol (represented by the function $D_4(\cdot)$).

The processor of the respective device may shuffle (e.g., randomly permute, etc.) the dataset 530A for Party A, and/or shuffle the dataset 530B for Party B. The processor of the respective device may also record, save, keep, or otherwise preserve the permutation of the shuffling of the dataset 530A and/or the permutation of the shuffling of the dataset 530B (to prepare for the un-shuffling process at block 445).

It is to be understood that at block 440, for Party A and/or Party B, a sequence of the transforming of the dataset and the shuffling of the dataset may be switched or changed, without impacting the purpose of the resultant dataset. For example, the processor may shuffle the dataset 530A, and then transform the shuffled dataset 530A for Party A. The processor may also shuffle the dataset 530B, and then transform the shuffled dataset 530B for Party B.

The processor of the respective device may exchange the dataset 530A (after being shuffled) with the dataset 530B (after being shuffled) between Party A and Party B. For Party A, the processor may dispatch or send the dataset 530A (after being shuffled) to Party B, and receive or obtain the dataset 530B (after being shuffled) from Party B as dataset 535A (see FIG. 5C). For Party B, the processor may dispatch or send the dataset 530B (after being shuffled) to Party A, and receive or obtain the dataset 530A (after being shuffled) from Party A as dataset 535B (see FIG. 5C). It is to be understood that since the dataset 530A and the dataset 530B have been transformed (e.g., encoded, etc.), the corresponding receiving party may not know the real data in the received dataset. Processing may proceed from block 440 to block 445.

Figure 5D:
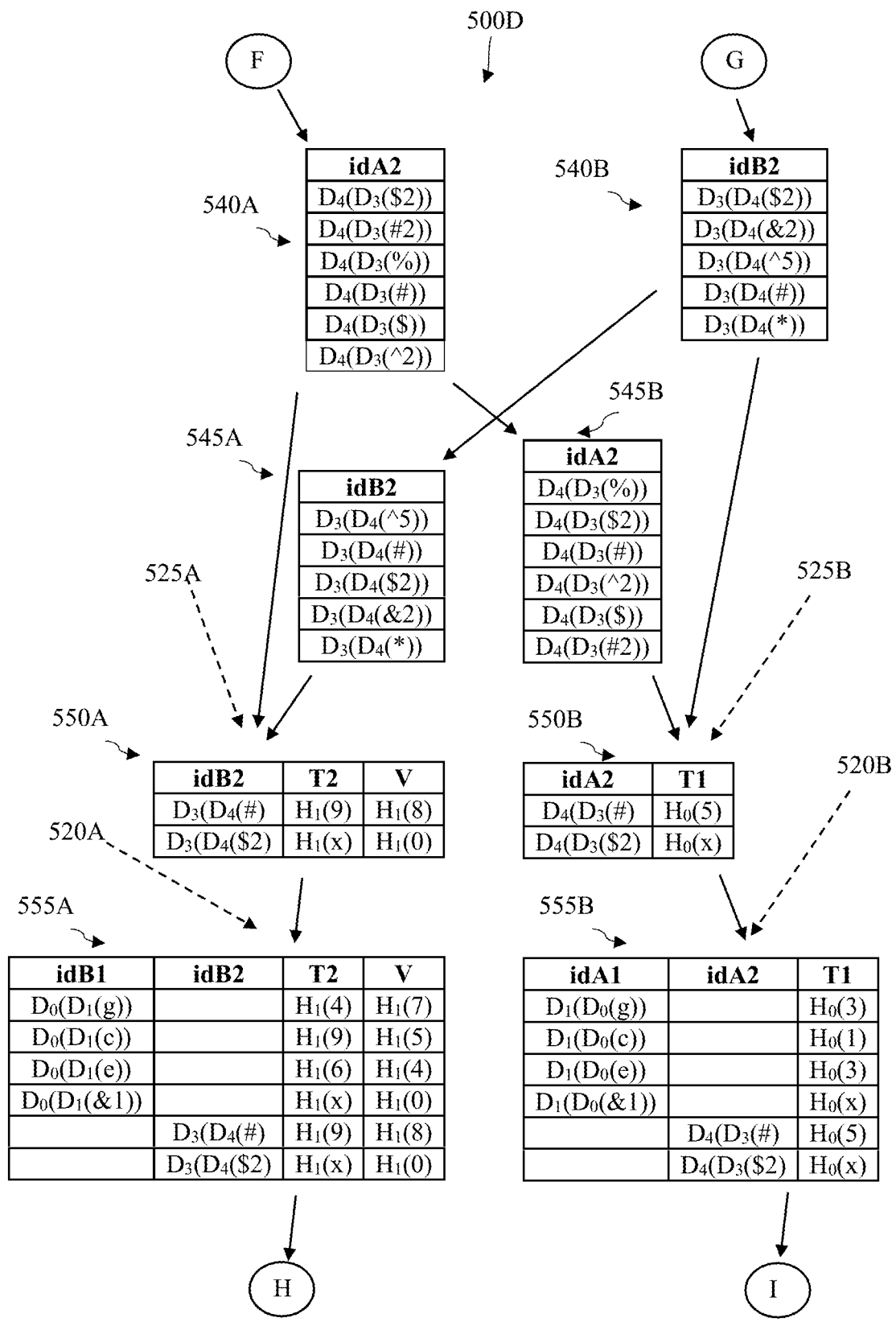

At block 445 (Transform, exchange, and un-shuffle), the processor of the respective device may transform the dataset 535A using a transforming scheme for Party A (to obtain or generate the dataset 540A of FIG. 5D). In an example embodiment, the processor may decrypt (or encrypt, encode, decode, manipulate, compress, decompress, convert, etc.) the dataset 535A using e.g., a key of Party A based on an ECDH algorithm or protocol (represented by the function $D_0(\cdot)$), and then encrypt (or decrypt, encode, decode, manipulate, compress, decompress, convert, etc.) the dataset 535A (to obtain or generate the dataset 540A) using e.g., the other key of Party A based on an ECDH algorithm or protocol (represented by the function $D_3(\cdot)$). That is, the dataset 535A is de-transformed (e.g., to remove the key $D_0(\cdot)$) and then transformed again (to add the key $D_3(\cdot)$) to obtain or generate the dataset 540A.

The processor may also transform the dataset 535B using a transforming scheme for Party B (to obtain or generate the dataset 540B of FIG. 5D). In an example embodiment, the processor may decrypt (or encrypt, encode, decode, manipulate, compress, decompress, convert, etc.) the dataset 535B using e.g., a key of Party B based on the ECDH algorithm or protocol (represented by the function $D_1(\cdot)$), and then encrypt (or decrypt, encode, decode, manipulate, compress, decompress, convert, etc.) the dataset 535B (to obtain or generate the dataset 540B) using e.g., the other key of Party B based on the ECDH algorithm or protocol (represented by the function $D_4(\cdot)$). That is, the dataset 535B is de-transformed (e.g., to remove the key $D_1(\cdot)$) and then transformed again (to add the key $D_4(\cdot)$) to obtain or generate the dataset 540B.

The processor of the respective device may exchange the dataset 540A with the dataset 540B between Party A and Party B. For Party A, the processor may dispatch or send the dataset 540A to Party B, and receive or obtain the dataset 540B from Party B as dataset 545A (see FIG. 5D). For Party B, the processor may dispatch or send the dataset 540B to Party A, and receive or obtain the dataset 540A from Party A as dataset 545B (see FIG. 5D).

The processor of the respective device may un-shuffle the dataset 545A for Party A based on the permutation (of the shuffling of the dataset 530A) preserved at block 440, such that the records (rows) in the dataset 545A and in the dataset 530A have a same sequence or order (except the transforming scheme being used on the records/rows). The processor of the respective device may also un-shuffle the dataset 545B for Party B based on the permutation (of the shuffling of the dataset 530B) preserved at block 440, such that the records (rows) in the dataset 545B and in the dataset 530B have a same sequence or order (except the transforming scheme being used on the records/rows). Processing may proceed from block 445 to block 450.

At block 450 (Match and combine), the processor of the respective device may perform search for a match (or an inner join operation, etc.) between the dataset 540A and the dataset 545A to obtain or generate an intersection (dataset 550A of FIG. 5D) for Party A. It is to be understood that the above operation includes for each identification in the dataset 545A that matches the identification in the dataset 540A, adding or appending the record (or row) of the dataset 545A that contains the matched identification to the dataset 550A, and adding or appending the features or attributes or data (e.g., T2 and V) of the corresponding record (or row) of the dataset 525A to the dataset 550A. It is to be understood that since the records of the dataset 545A have a same sequence or order as the records of the dataset 530A (which is extracted from the dataset 525A), the features or attributes or data (e.g., T2 and V) of the corresponding record (or row) of the dataset 525A are associated with the corresponding IDs of the dataset 545A. It is to be understood that the results of the functions $D_3(D_4(p))$ and $D_4(D_3(p))$ may be the same for a same parameter "p".

The processor may also perform search for a match (or an inner join operation, etc.) between the dataset 540B and the dataset 545B to obtain or generate an intersection (dataset 550B of FIG. 5D) for Party B. It is to be understood that the above operation includes for each identification in the dataset 545B that matches the identification in the dataset 540B, adding or appending the record (or row) of the dataset 545B that contains the matched identification to the dataset 550B, and adding or appending the features or attributes or data (e.g., T1) of the corresponding record (or row) of the dataset 525B to the dataset 550B. It is to be understood that since the records of the dataset 545B have a same sequence or order as the records of the dataset 530B (which is extracted from the dataset 525B), the features or attributes or data (e.g., T1) of the corresponding record (or row) of the dataset 525B are associated with the corresponding IDs of the dataset 545B.

It is to be understood that in an example embodiment, the idB1 field in the dataset/intersection 550A may be optional since the matching is based on idB2 (after idB1 being mismatched in dataset 525A). The idA1 field in the dataset/intersection 550B may be optional since the matching is based on idA2 (after idA1 being mismatched in dataset 525B).

It is to be understood that for Party A, data in the intersection 550A are also transformed (e.g., encoded, etc.) by Party B (via $D_4(\cdot)$ and $H_1(\cdot)$), and thus Party A may not know the real data in the intersection 550A. For Party B, data in the intersection 550B are also transformed (e.g., encoded, etc.) by Party A (via $D_3(\cdot)$ and $H_0(\cdot)$), and thus Party B may not know the real data in the intersection 550B. That is, the matching or inner join operation conducted, as described above, is a "private" matching or inner join operation. The processor performs a private identity matching without revealing the intersection of datasets of the two parties.

The processor of the respective device may combine the records/rows of the dataset 520A and the records/rows of the dataset 550A for Party A to obtain or generate the dataset 555A. It is to be understood that in the dataset 555A, the blank values for idB2 indicate that such values are not important (since the higher priority ID field idB1 has matched), and the blank values for idB1 indicate that such values are not important (since although the ID field idB1 failed to match but the ID field idB2 has matched, indicating that the matched record(s) is/are for a same user/member).

The processor of the respective device may also combine the records/rows of the dataset 520B and the records/rows of the dataset 550B for Party B to obtain or generate the dataset 555B. It is to be understood that in the dataset 555B, the blank values for idA2 indicate that such values are not important (since the higher priority ID field idA1 has matched), and the blank values for idA1 indicate that such values are not important (since although the ID field idA1 failed to match but the ID field idA2 has matched, indicating that the matched record(s) is/are for a same user/member). Processing may proceed from block 450 to block 455.

At block 455 (Generate shares), the processor of the respective device may generate secret shares for each attribute or feature or data (e.g., those elements that are not identifications of the ID field/column) in the dataset 555A for Party A to obtain or generate the dataset 560A. The processor may generate secret shares for each attribute or feature or data in the dataset 555B for Party B to obtain or generate the dataset 560B.

Figure 5E:
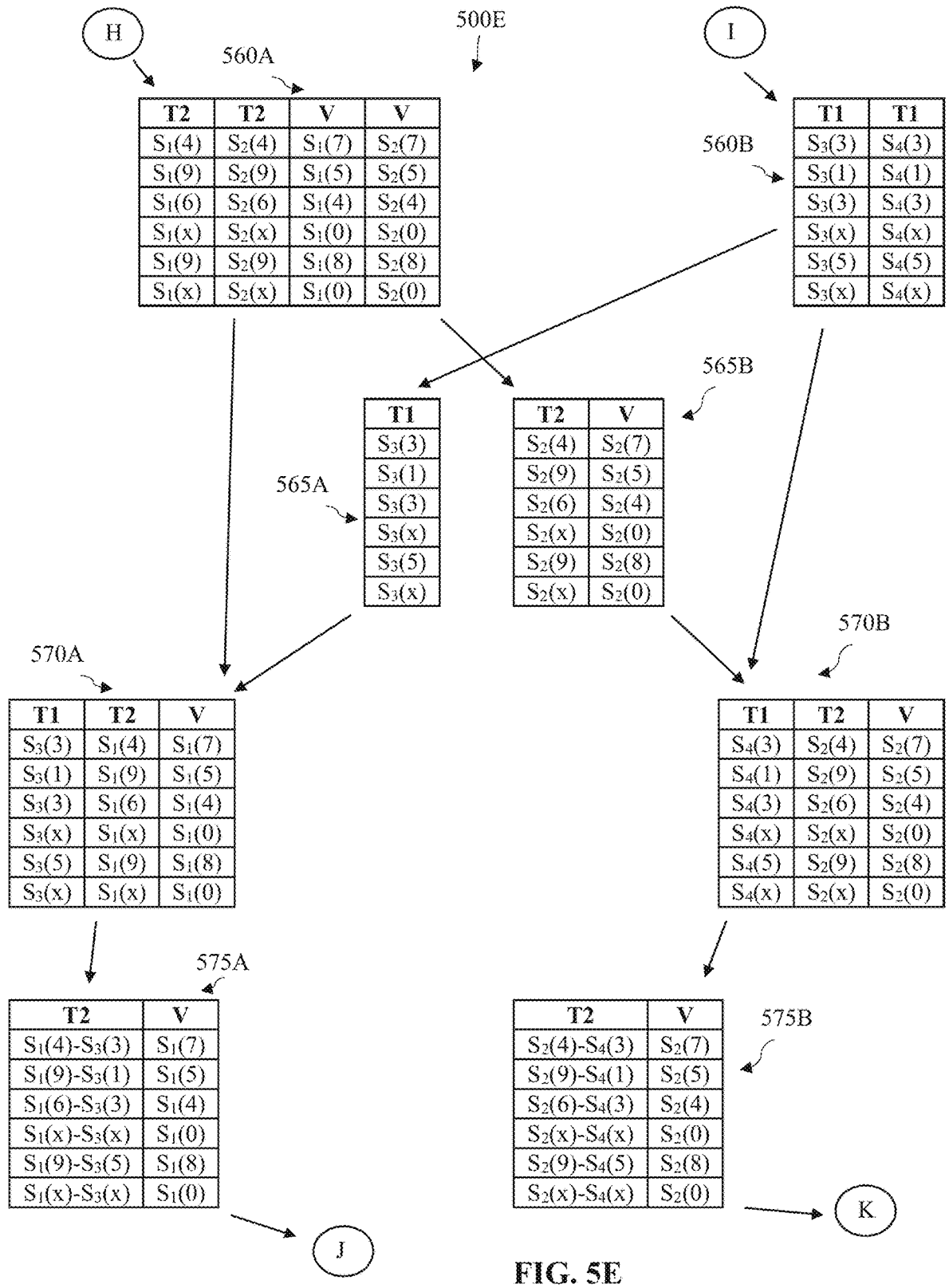
Figure 5F:
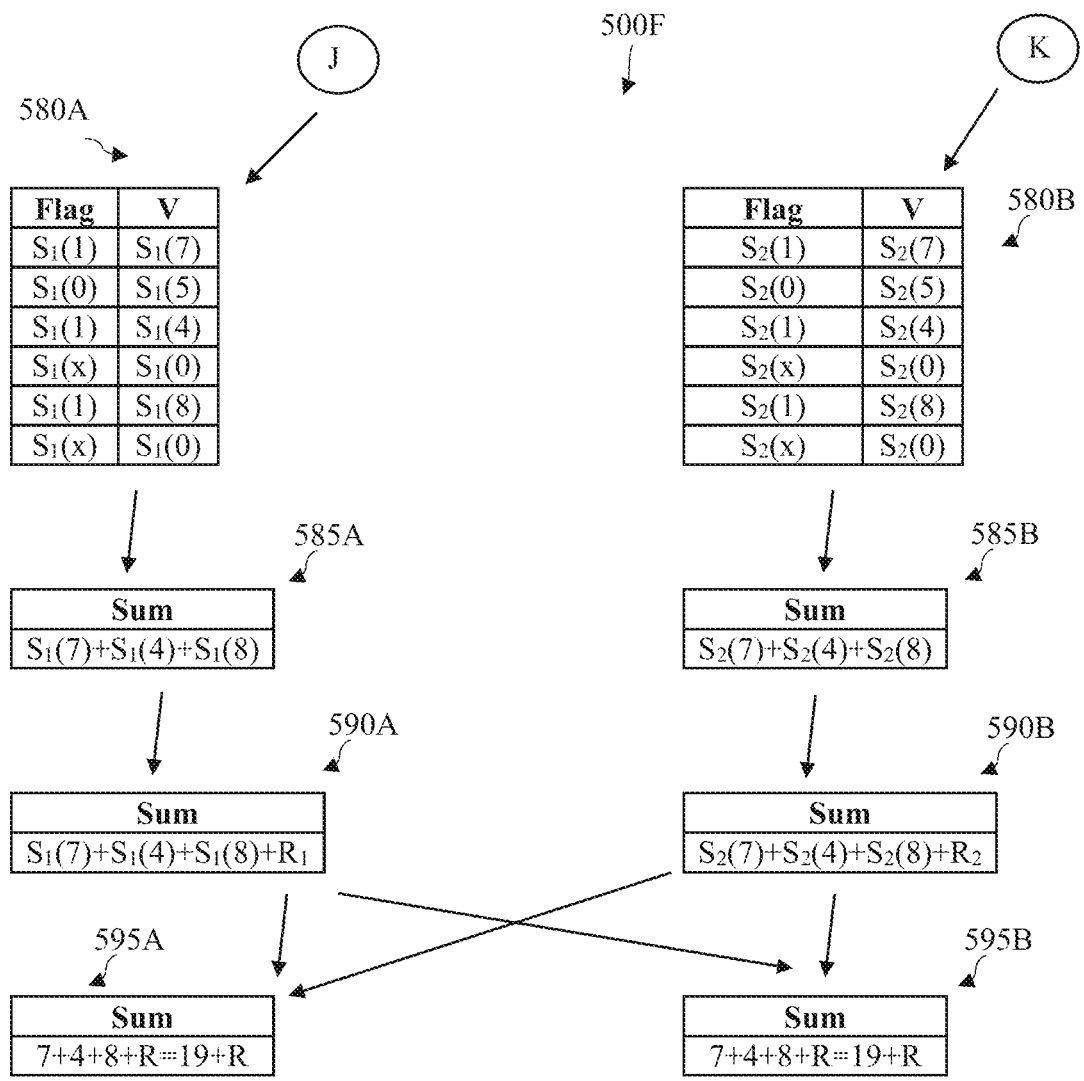

In an example embodiment, the processor of the respective device may generate a corresponding mask and may mask each attribute or feature in the dataset 555A with its corresponding mask using a masking scheme, to obtain or generate a dataset 560A. In an example embodiment, each mask is a random number or random plaintext (e.g., having a length of 64 bits, etc.). In an example embodiment, the masking scheme is a homomorphic operation or computation (e.g., addition, subtraction, etc.) in an additively homomorphic encryption algorithm or protocol. For example, as shown in FIG. 5E, the processor may mask the T2 data $H_1(4)$ in the dataset 555A with a mask (represented as $S_1(4)$ in the dataset 560A), and homomorphically compute the T2 data $S_2(4)$ in the dataset 560A by subtracting the mask $S_1(4)$ from $H_1(4)$, where the mask $S_1(4)$ is generated for and corresponds to the T2 time "4". It is to be understood that the combination of the mask $S_1(4)$ and the homomorphic results $S_2(4)$ is the T2 data $H_1(4)$, which is transformed or encrypted by Party B.

Similarly, for each attribute or feature or data in the dataset 555B for Party B, the processor may generate a corresponding mask and may mask each attribute or feature in the dataset 555B with its corresponding mask using a masking scheme, to obtain or generate a dataset 560B. In an example embodiment, each mask is a random number or random plaintext (e.g., having a length of 64 bits, etc.). In an example embodiment, the masking scheme is a homomorphic operation or computation (e.g., addition, subtraction, etc.) in an additively homomorphic encryption algorithm or protocol. For example, as shown in FIG. 5E, the processor may mask the T1 data $H_0(3)$ in the dataset 555B with a mask (represented as $S_4(3)$ in the dataset 560B), and homomorphically compute the T1 data $S_3(3)$ in the dataset 560B by subtracting the mask $S_4(3)$ from $H_0(3)$, where the mask $S_4(3)$ is generated for and corresponds to the T1 time "3". It is to be understood that the combination of the mask $S_4(3)$ and the homomorphic results $S_3(3)$ is the T1 data $H_0(3)$, which is transformed or encrypted by Party A. Processing may proceed from block 455 to block 460.

At block 460 (Exchange shares), the processor of the respective device may exchange the dataset 565A with the dataset 565B between Party A and Party B. For Party A, the processor may dispatch or send the dataset 565B (the homomorphic results of the features or attributes) to Party B. For Party B, the processor may dispatch or send the dataset 565A (the homomorphic results of the features or attributes) to Party A. For Party A, the processor may also de-transform or decrypt the dataset 565A (the homomorphic results of the features or attributes) using a key of Party A based on the additively homomorphic encryption algorithm or protocol to e.g., remove the key $H_0(\cdot)$. For Party B, the processor may also de-transform or decrypt the dataset 565B (the homomorphic results of the features or attributes) using a key of Party B based on the additively homomorphic encryption algorithm or protocol to e.g., remove the key $H_1(\cdot)$. Processing may proceed from block 460 to block 465.

At block 465 (Construct shares), the processor may construct the secret shares (dataset 570A) for Party A by combining (e.g., performing a union operation, etc.) the dataset 565A and the masks of the dataset 560A. The processor may construct the secret shares (dataset 570B) for Party B by combining (e.g., performing a union operation, etc.) the dataset 565B and the masks of the dataset 560B. It is to be understood that the datasets (570A, 570B) contain records or elements represented by random numbers (e.g., masks which are random numbers; or results of masks subtracting or adding real values, which are still random numbers) without being transformed (e.g., encrypted). It is also to be understood that a combination of the datasets or secret shares (570A and 570B, 575A and 575B, 580A and 570B, 585A and 585B, 590A and 590B, or 595A and 595B) may result in the real data (e.g., with or without noise). See description of block 40 for details. Processing may proceed from block 465 to block 470.

At block 470 (Perform secure MPC), the processor of the respective device may perform secure multi-party computation (see descriptions below) on the secret shares of Party A and/or perform secure multi-party computation (see descriptions below) on the secret shares of Party B.

In an example embodiment, the processor may subtract T1 from T2 for the dataset 570A to obtain or generate the dataset 575A for Party A, and/or subtract T1 from T2 for the dataset 570B to obtain or generate the dataset 575B for Party B.

In an example embodiment, the processor may determine whether T2 is greater than 0 and less than a predetermined value (e.g., less than 7) for the dataset 575A to obtain or generate the dataset 580A for Party A. If T2 is greater than 0 and less than the predetermined value, the processor may set the Flag value in the dataset 580A to the secret share of 1 ($S_1(1)$, to represent "True"), which is a random number for Party A. If T2 is not greater than 0 or not less than the predetermined value, the processor may set the Flag value in the dataset 580A to the secret share of 0 ($S_1(0)$, to represent "False"), which is a random number for Party A.

In an example embodiment, the processor may determine whether T2 is greater than 0 and less than a predetermined value (e.g., less than 7) for the dataset 575B to obtain or generate the dataset 580B for Party B. If T2 is greater than 0 and less than the predetermined value, the processor may set the Flag value in the dataset 580B to the secret share of 1 ($S_2(1)$, to represent "True"), which is a random number for Party B. If T2 is not greater than 0 or not less than the predetermined value, the processor may set the Flag value in the dataset 580B to the secret share of 0 ($S_2(0)$, to represent "False"), which is a random number for Party B.

In an example embodiment, the determination of whether T2 is greater than 0 and less than the predetermined value for Party A and/or Party B may be conducted via, e.g., an oblivious comparison algorithm or protocol (or secret comparison algorithm or protocol) that is based on the oblivious transfer algorithm or protocol. For example, the oblivious comparison algorithm or protocol may receive the T2 field of the dataset 575A from Party A as an input, the T2 field of the dataset 575B from Party B as another input, and generate the output (the result of the determination of T2) to Party A and/or Party B.

In an example embodiment, the processor may further sum the "V" field of the dataset 580A for those records/rows that do not have a secret share of zero (i.e., $S_1(0)$) in either the Flag field or in the V field, and store or save the results in the "Sum" field of the dataset 585A, to generate the dataset 585A for Party A. The processor may also sum the "V" field of the dataset 580B for those records/rows that do not have a secret share of zero (i.e., $S_2(0)$) in either the Flag field or in the V field, and store or save the results in the "Sum" field of the dataset 585B, to generate the dataset 585B for Party B.

It is to be understood that Party A now has the dataset 585A (a secret share) indicating the total value of all users who clicked on e.g., a link or the like on Party A's platform and went to Party B's website, within a certain period of time (e.g., within 7 minutes) after the users clicked on e.g., a link or the like on Party A's platform and made valuable interaction. It is also to be understood that Party A does not know the real data in the dataset 585A because the secret share is a random value.

It is to be understood that Party B now has the dataset 585B (a secret share) indicating the total value of all users who clicked on e.g., a link or the like on Party A's platform and went to Party B's website, within a certain period of time (e.g., within 7 minutes) after the users clicked on e.g., a link or the like on Party A's platform and made valuable interaction. It is also to be understood that Party B does not know the real data in the dataset 585B because the secret share is a random value. Processing may proceed from block 470 to block 475. It is further to be understood that a combination of the secret shares (585A and 585B) may result in the real data ("19").

At block 475 (Generate noise), the processor of the respective device may perform or execute an oblivious transfer algorithm or protocol to jointly generate noise shares by Party A and Party B. In an example embodiment, the processor of Party A may generate two messages ($M_0$, $M_1$) based on e.g., randomly generated noise data and/or the parameters for deferential privacy algorithm or protocol, and the processor of Party B may generate a random bit indicating which message may be received from Party A. The processor of the respective device may also perform a 1-2 oblivious transfer using the messages ($M_0$, $M_1$) and the random bit as inputs, and generate shares ($R_1$ and $R_2$) of a noise R for Party A and Party B, respectively. For example, the processor of respective device may generate a share $R_1$ of a noise R for Party A and/or generate a share $R_2$ of the noise R for party B. In an example embodiment, the noise R may be constructed by e.g., adding the noise shares ($R_1$ and $R_2$, etc.).

The processor of respective device may add the noise share (e.g., $R_1$, etc.) to the data share (e.g., the secret share in the dataset 585A of FIG. 5F, etc.) to generate the data share with added noise (e.g., the secret share in 590A, etc.) for Party A. The processor of respective device may add the corresponding noise share (e.g., $R_2$, etc.) to the data share (e.g., the secret share in the dataset 585B, etc.) to generate the data share with added noise (e.g., the secret share in 590B, etc.) for Party B. It is to be understood that due to the oblivious transfer conducted at block 475, Party A may not know the noise share $R_1$ of Party B, and Party B may not know the noise share $R_1$ of Party A. In an example embodiment, the processes in block 475 may be optional. Processing may proceed from block 475 to block 480.

At block 480 (Construct results), the processor of the respective device may exchange the dataset 585A with the dataset 585B between Party A and Party B. For Party A, the processor may dispatch or send the dataset 585A to Party B, and/or receive or obtain the dataset 585B from Party B. The processor may also construct the results ("19") by e.g., adding data in the dataset 585A and data in the received dataset 585B to generate the dataset 595A. That is, the total value of all users who clicked on e.g., a link or the like on Party A's platform and went to Party B's website, within a certain period of time (e.g., within 7 minutes) after the users clicked on e.g., a link or the like on Party A's platform and made valuable interaction, is "19". In an example embodiment, when the processes in block 475 are not optional, dataset 590A and the dataset 590B are used (instead of 585A and 585B), to construct a result which is the real result (e.g., the value of 19) plus the noise R, which is jointly generated by Party A (via $R_1$) and Party B (via $R_2$).

For Party B, the processor may dispatch or send the dataset 585B to the processor of Party A, and/or receive or obtain the dataset 585A from Party A. The processor may also construct the results ("19") by e.g., adding data in the dataset 585B and data in the received dataset 585A. That is, the total value of all users who clicked on e.g., a link or the like on Party A's platform and went to Party B's website, within a certain period of time (e.g., within 7 minutes) after the users clicked on e.g., a link or the like on Party A's platform and made valuable interaction, is "19", which is the same as the result determined by Party A. In an example embodiment, when the processes in block 475 are not optional, dataset 590A and the dataset 590B are used (instead of 585A and 585B), to construct a result which is the real result (e.g., the value of 19) plus the noise R. It is to be understood that after constructing the result (with the processes of block 475), Party A or Party B or both Party A and Party B may get a same result (e.g., the real value 19 plus the noise R).

It is also to be understood that other results may also be constructed or determined by combining the secret shares (570A and 570B), the secret shares (575A and 575B), the secret shares (580A and 580B), the secret shares (585A and 585B), the secret shares (590A and 590B), etc. It is further to be understood that other results may further be constructed or determined by conducting other MPC computations on the secret shares to get secret shares of the Party A and Party B, and by combining the secret shares of both Party A and Party B.

FIG. 6 is a schematic structural diagram of an example computer system 600 applicable to implementing an electronic device (for example, the server or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIGS. 2, 4A, and 4B and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for protecting membership and data in secure multi-party computation and communication, the method comprising: generating a padding dataset, a size of the padding dataset being determined based on a data privacy configuration; up-sampling a first dataset with the padding dataset; transforming the first dataset; dispatching the first dataset; performing an intersection operation based on the first dataset and a second dataset to generate a third dataset; generating a first share based on the third dataset; and constructing a result based on the first share and a second share.

Aspect 2. The method of aspect 1, further comprising: shuffling the padding dataset before up-sampling the first dataset with the padding dataset.

Aspect 3. The method of aspect 1 or aspect 2, further comprising: shuffling a first identification field of the second dataset; recording a permutation of the shuffling of the first identification field.

Aspect 4. The method of aspect 3, further comprising: receiving a second identification field; and un-shuffling the second identification field based on the recorded permutation.

Aspect 5. The method of any one of aspects 1-4, wherein an intersection of the padding dataset and the first dataset is empty.

Aspect 6. The method of any one of aspects 1-5, wherein the first dataset includes a first identification field and a second identification field, the first identification field having a higher priority than the second first identification field, and wherein the second dataset includes a third identification field and a fourth identification field, the third identification field having a higher priority than the fourth first identification field.

Aspect 7. The method of aspect 6, further comprising: for each identification in the first identification field that matches an identification in the third identification field, removing a row having the matched identification from the first dataset and adding the removed row to a first intersection.

Aspect 8. The method of aspect 7, further comprising: for each identification in the second identification field that matches an identification in the fourth identification field, removing a row having the matched identification from the first dataset and adding the removed row to the first intersection.

Aspect 9. The method of any one of aspects 1-8, wherein the data privacy configuration includes a first parameter and a second parameter, wherein the size of the padding dataset is determined such that the intersection operation is differentially private based on the first parameter and the second parameter.

Aspect 10. The method of aspect 9, wherein the size of the padding dataset is determined based on a number of identification fields of the first dataset.

Aspect 11. The method of aspect 10, wherein the size of the padding dataset is determined further based on a number of intersection operations.

Aspect 12. The method of any one of aspects 1-11, further comprising: performing an oblivious transfer to generate a first noise data; and applying the first noise data to the first share.

Aspect 13. The method of aspect 12, wherein the performing of the oblivious transfer includes generating a second noise data, and the method further comprises applying the second noise data to the second share.

Aspect 14. A secure multi-party computation and communication system, the system comprising: a memory to store a first dataset; a processor to: generate a padding dataset, a size of the padding dataset being determined based on a data privacy configuration; up-sample the first dataset with the padding dataset; transform the first dataset; dispatch the first dataset; perform an intersection operation based on the first dataset and a second dataset to generate a third dataset; generate a first share based on the third dataset; and construct a result based on the first share and a second share.

Aspect 15. The system of aspect 14, wherein the processor is to further: shuffle the padding dataset before up-sampling the first dataset with the padding dataset Aspect 16. The system of aspect 14 or aspect 15, wherein the processor is to further: shuffle a first identification field of the second dataset; record a permutation of the shuffling of the first identification field; receive a second identification field; and un-shuffle the second identification field based on the recorded permutation.

Aspect 17. A non-transitory computer-readable medium having computer-executable instructions stored thereon that, upon execution, cause one or more processors to perform operations comprising: generating a padding dataset, a size of the padding dataset being determined based on a data privacy configuration; up-sampling a first dataset with the padding dataset; transforming the first dataset; dispatching the first dataset; performing an intersection operation based on the first dataset and a second dataset to generate a third dataset; generating a first share based on the third dataset; and constructing a result based on the first share and a second share.

Aspect 18. The computer-readable medium of aspect 17, wherein the operations further comprise: shuffling the padding dataset before up-sampling the first dataset with the padding dataset.

Aspect 19. The computer-readable medium of aspect 17 or aspect 18, wherein the operations further comprise: shuffling a first identification field of the second dataset; recording a permutation of the shuffling of the first identification field.

Aspect 20. The computer-readable medium of aspect 19, wherein the operations further comprise: receiving a second identification field; and un-shuffling the second identification field based on the recorded permutation.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for protecting membership and data in secure multi-party computation and communication, the method comprising:
generating a padding dataset, a size of the padding dataset being determined based on a data privacy configuration;
up-sampling a first dataset with the padding dataset by inserting elements of the padding dataset and random elements into the first dataset;
transforming the first dataset;
dispatching the first dataset;
performing an intersection operation based on the first dataset and a second dataset to generate a third dataset;
generating a first share based on the third dataset; and
constructing a result based on the first share and a second share,
wherein the first dataset includes a first identification field and a second identification field, the first identification field having a higher priority than the second identification field, and
wherein the second dataset includes a third identification field and a fourth identification field, the third identification field having a higher priority than the fourth identification field.

2. The method of claim 1, further comprising:
shuffling the padding dataset before up-sampling the first dataset with the padding dataset.

3. The method of claim 1, further comprising:
shuffling the fourth identification field of the second dataset;
recording a permutation of the shuffling of the fourth identification field.

4. The method of claim 3, further comprising:
receiving a fifth identification field; and
un-shuffling the fifth identification field based on the recorded permutation.

5. The method of claim 1, wherein an intersection of the padding dataset and the first dataset is empty.

6. The method of claim 1, further comprising:
for each identification in the first identification field that matches an identification in the third identification field, removing a row having the matched identification from the first dataset and adding the removed row to a first intersection.

7. The method of claim 6, further comprising:
for each identification in the second identification field that matches an identification in the fourth identification field, removing a row having the matched identification from the first dataset and adding the removed row to the first intersection.

8. The method of claim 1, wherein the data privacy configuration includes a first parameter and a second parameter,
wherein the size of the padding dataset is determined such that the intersection operation is differentially private based on the first parameter and the second parameter.

9. The method of claim 8, wherein the size of the padding dataset is determined based on a number of identification fields of the first dataset.

10. The method of claim 9, wherein the size of the padding dataset is determined further based on a number of intersection operations.

11. The method of claim 1, further comprising:
performing an oblivious transfer to generate a first noise data; and
applying the first noise data to the first share.

12. The method of claim 11, wherein the performing of the oblivious transfer includes generating a second noise data, and
the method further comprises applying the second noise data to the second share.

13. A secure multi-party computation and communication system, the system comprising:
a memory to store a first dataset;
a processor to:
generate a padding dataset, a size of the padding dataset being determined based on a data privacy configuration;
up-sample the first dataset with the padding dataset by inserting elements of the padding dataset and random elements into the first dataset;
transform the first dataset;
dispatch the first dataset;
perform an intersection operation based on the first dataset and a second dataset to generate a third dataset;
generate a first share based on the third dataset; and
construct a result based on the first share and a second share,
wherein the first dataset includes a first identification field and a second identification field, the first identification field having a higher priority than the second identification field, and
wherein the second dataset includes a third identification field and a fourth identification field, the third identification field having a higher priority than the fourth identification field.

14. The system of claim 13, wherein the processor is to further:
shuffle the padding dataset before up-sampling the first dataset with the padding dataset.

15. The system of claim 13, wherein the processor is to further:
shuffle the fourth identification field of the second dataset;
record a permutation of the shuffling of the fourth identification field;
receive a fifth identification field; and
un-shuffle the fifth identification field based on the recorded permutation.

16. A non-transitory computer-readable medium having computer-executable instructions stored thereon that, upon execution, cause one or more processors to perform operations comprising:

generating a padding dataset, a size of the padding dataset being determined based on a data privacy configuration;

up-sampling a first dataset with the padding dataset by inserting elements of the padding dataset and random elements into the first dataset;

transforming the first dataset;

dispatching the first dataset;

performing an intersection operation based on the first dataset and a second dataset to generate a third dataset;

generating a first share based on the third dataset; and constructing a result based on the first share and a second share, wherein the first dataset includes a first identification field and a second identification field, the first identification field having a higher priority than the second identification field, and wherein the second dataset includes a third identification field and a fourth identification field, the third identification field having a higher priority than the fourth identification field.

17. The computer-readable medium of claim 16, wherein the operations further comprise:

shuffling the padding dataset before up-sampling the first dataset with the padding dataset.

18. The computer-readable medium of claim 16, wherein the operations further comprise:

shuffling the fourth identification field of the second dataset;

recording a permutation of the shuffling of the fourth identification field.

19. The computer-readable medium of claim 18, wherein the operations further comprise:

receiving a fifth identification field; and un-shuffling the fifth identification field based on the recorded permutation.

* * * * *